(12) United States Patent
Thesling

(10) Patent No.: US 7,634,021 B2
(45) Date of Patent: *Dec. 15, 2009

(54) RECEIVER BASED TRANSMISSION CHARACTERISTIC ESTIMATOR

(75) Inventor: William H. Thesling, Hudson, OH (US)

(73) Assignee: ViaSat, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/272,569

(22) Filed: Nov. 17, 2008

(65) Prior Publication Data

US 2009/0067538 A1   Mar. 12, 2009

Related U.S. Application Data

(63) Continuation of application No. 11/397,352, filed on Apr. 3, 2006, now Pat. No. 7,466,756, which is a continuation of application No. 10/857,085, filed on May 28, 2004, now Pat. No. 7,054,391.

(60) Provisional application No. 60/474,697, filed on May 30, 2003, provisional application No. 60/529,132, filed on Dec. 12, 2003.

(51) Int. Cl.
*H04L 27/00* (2006.01)
(52) U.S. Cl. .................. 375/295; 375/340; 375/358
(58) Field of Classification Search ............. 375/340, 375/221, 219, 295, 358
See application file for complete search history.

(56) References Cited

U.S. PATENT DOCUMENTS

| | | | |
|---|---|---|---|
| 5,589,796 A | 12/1996 | Alberth, Jr. et al. | |
| 5,774,788 A | 6/1998 | Hannah et al. | |
| 5,790,601 A | 8/1998 | Corrigan, III et al. | |
| 5,995,811 A * | 11/1999 | Watanabe | 455/115.1 |
| 6,358,205 B1 | 3/2002 | Ustuner et al. | |
| 6,366,620 B1 | 4/2002 | Jackson et al. | |
| 6,529,482 B1 | 3/2003 | Lundby | |
| 6,539,213 B1 | 3/2003 | Richards et al. | |
| 6,597,923 B1 * | 7/2003 | Vanghi et al. | 455/522 |
| 6,901,143 B1 * | 5/2005 | Ono | 379/414 |
| 6,944,471 B2 * | 9/2005 | Qin et al. | 455/522 |
| 7,054,391 B2 * | 5/2006 | Thesling | 375/340 |
| 7,466,756 B2 * | 12/2008 | Thesling | 375/249 |
| 2001/0010709 A1 | 8/2001 | Iwamatsu et al. | |
| 2001/0016014 A1 | 8/2001 | Nam | |
| 2002/0019218 A1 | 2/2002 | Greverie et al. | |
| 2002/0094015 A1 | 7/2002 | Harles et al. | |
| 2002/0094836 A1 * | 7/2002 | Nakamura et al. | 455/522 |
| 2003/0081696 A1 * | 5/2003 | Kim et al. | 375/316 |
| 2003/0112891 A1 | 6/2003 | Ozaki | |
| 2003/0156657 A1 | 8/2003 | Schrader et al. | |
| 2003/0156658 A1 | 8/2003 | Dartois | |
| 2004/0058653 A1 * | 3/2004 | Dent | 455/69 |

* cited by examiner

*Primary Examiner*—Emmanuel Bayard
(74) *Attorney, Agent, or Firm*—Townsend and Townsend and Crew LLP

(57) ABSTRACT

A processor-implemented method of estimating the saturation level of a transmitter from a transmitted communication signal received from the transmitter comprises generating a received data signal from the transmitted communication signal received from the transmitter, generating a transmitted data signal from the received data signal that corresponds to the actual data signal generated at the transmitter, comparing the transmitted data signal to the received data signal, and estimating the saturation level of the transmitter based on the comparison of the transmitted data signal to the received data signal.

32 Claims, 18 Drawing Sheets

RECEIVER BASED TRANSMISSION CHARACTERISTIC ESTIMATOR

This application is a continuation of U.S. patent application No. 11/397,352, filed Apr. 3, 2006, entitled "RECEIVER BASED SATURATION ESTIMATOR", which is a continuation of U.S. patent application Ser. No. 10/857,085, filed May 28, 2004, entitled "RECEIVER BASED SATURATION ESTIMATOR" and issued May 30, 2006 as U.S. Pat. No. 7,054,391. These claim the benefit of priority to U.S. Provisional Application Ser. No. 60/474,697, filed May 30, 2003 and U.S. Provisional Application Ser. No. 60/529,132, filed on Dec. 12, 2003. The entire disclosures of Application Ser. Nos. 60/474,697 and 60/529,132, U.S. patent application Ser. No. 11/397,352, and U.S. Pat. No. 7,054,391 are incorporated herein by reference.

BACKGROUND

1. Technical Field

This application generally relates to communication systems, and particularly relates to digital communication receiver systems.

2. Description of the Related Art

A bidirectional satellite system typically employs a multifrequency Time Division Multiple Access (TDMA) format in a return link to a receive hub. The return link facilitates communication for multiple users transmitting to the receive hub over multiple channels. To maintain a link between a return link amplifier, such as a Block Up Converter (BUC), and the receive hub, the receive hub may instruct the return link amplifier to increase its transmit power. It is often desirable to operate the return link amplifier near saturation, yet be far enough below saturation to preclude the deleterious effects of saturation, such as spectral re-growth and/or adjacent channel interference.

Most saturation detection devices are transmitter-based. Typical return link amplifiers or control devices operating the return link amplifier may have processing capabilities to determine the degree of saturation at which the return link amplifier is operating and transmit this data to the receive hub. Based on this received data, the receive hub can determine whether to instruct the return link amplifier to increase a transmit power level to maintain a link.

SUMMARY

A receiver-based saturation estimator comprises a first receiver processor, a transmit data processor, and a saturation estimator. The first receiver processor is operable to receive a transmitted communication signal from a transmitter and generate a received data signal from the transmitted communication signal received from the transmitter. The transmit data processor is operable to generate a transmitted data signal from the received data signal that corresponds to the actual data signal generated at the transmitter. The saturation estimator processor is operable to compare the transmitted data signal to the received data signal and estimate the saturation level of the transmitter based on the comparison of the transmitted data signal to the received data signal.

A processor-implemented method of estimating the saturation level of a transmitter from a transmitted communication signal received from the transmitter comprises filtering the transmitted communication signal to generate a received symbol sequence, decoding the received symbol sequence to recover data, and determining if the data is error free. If the data is error free, then the steps of generating the transmitted symbol sequence, comparing the transmitted symbol sequence to the received symbol sequence, and estimating the saturation level of the transmitter based on the comparison of the transmitted symbol sequence to the received symbol sequence are performed.

A processor-implemented method of estimating the saturation level of a transmitter from a transmitted communication signal received from the transmitter comprises generating a received data signal from the transmitted communication signal received from the transmitter, generating a transmitted data signal from the received data signal that corresponds to the actual data signal generated at the transmitter, comparing the transmitted data signal to the received data signal, and estimating the saturation level of the transmitter based on the comparison of the transmitted data signal to the received data signal.

DETAILED DESCRIPTION

Figure 1:
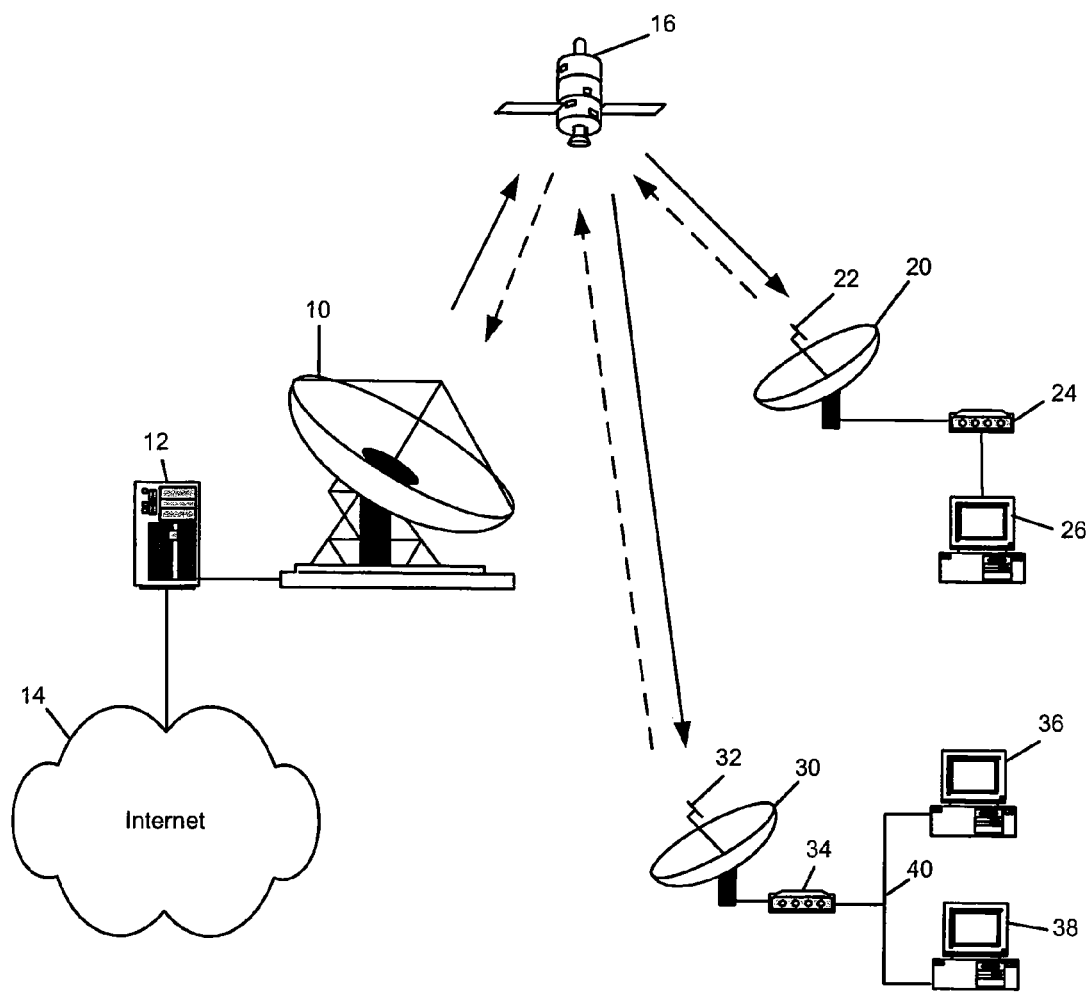
FIG. 1 is a block diagram of a satellite communication system.

FIG. 1 is a block diagram of a satellite communication system. The system includes an uplink antenna 10 connected to a satellite hub receiver 12. The hub receiver 12 may comprise a network controller or other system control device hardware and software operable to monitor and/or control data communication parameters. The satellite hub receiver 12 in turn is connected to a wide area network, such as the Internet 14. The hub receiver 12 communicates via a satellite 16 with a plurality of users via dish antennas 20 and 30. Each dish antenna 20 and 30 has an associated modem 24 and 34 that may communicate with one or more computers. For example, the modem 24 is connected only to one computer 26, while modem 34 is connected to a plurality of computers 36 and 38 via a network 40.

Each dish antenna 20 and 30 has an associated block up converter (BUC) 22 and 32. Typically the uplink antenna 10 includes a wideband transmitter to facilitate a forward link and a burst receiver to facilitate a return link. The dish antennas 20 and 30 receive the wideband signal from the uplink antenna 10 and transmit data to the uplink antenna 10 via a burst transmission, or via a continuous transmission.

The overall efficiency of the return link depends on the ability to run the BUCs 22 and 32 at an output power level that is as high as possible to obtain without the deleterious effects of saturation. BUC saturation is a non-linearity that distorts the transmitted signal. A common method to determine when a BUC is approaching saturation is to measure the output power of the BUC and send a signal back to the modem when the power exceeds a threshold. This method, however, adds cost to both the BUC and the modem. Also, due to a large number of variables (e.g., temperature, cabling length between the BUCs and the modems, etc.), it is often difficult to determine when a BUC is operating at or near saturation.

The systems and methods described herein provide for the estimation of the degree of BUC saturation at a receiver, such as the uplink antenna 10 and/or satellite hub receiver 12. The degree of BUC saturation is measured at the receiver from a transmitted communication signal received from the BUC transmitter. The receiver may then issue an instruction to a remote terminal to control the BUC transmit power level in response to the saturation estimation. The receiver may also control other parameters in a similar manner. Accordingly, because the saturation estimation and control are handled by the receiver rather than the BUC and/or the modem, the cost of the BUC and/or modem is reduced.

Additionally, each BUC will be able to operate at its true maximum power level instead of a predetermined maximum power level that may be below the BUC's actual maximum power level. For example, assume that a particular BUC specification requires a maximum transmit power level of 1.0 per unit W before the onset of saturation. However, if a particular BUC is capable of transmitting at 1.1 per unit W before the onset of saturation, the modem associated with the BUC will monitor the BUC transmit power level and prevent further power increases beyond 1.0 per unit W, thus preventing the BUC from transmitting at its true maximum power output level. The receiver-based saturation estimator, however, instructs the BUC to increase its transmit power based on the actual BUC saturation level, and thus the BUC will be able to transmit at a power level of up to 1.1 per unit W.

Likewise, each BUC will only operate up to its true saturation level. For example, assume that a particular BUC specification requires a maximum transmit power level of 1.0 per unit W before the onset of saturation. However, over time, a particular BUC may experience performance degradation, and may be capable of transmitting only up to 0.9 per unit W before the onset of saturation. Because the receiver-based saturation estimator can be used by the system controller when instructing the BUC to increase the transmit power based on the actual BUC saturation level, the BUC will not be overdriven deep into saturation.

Figure 2:
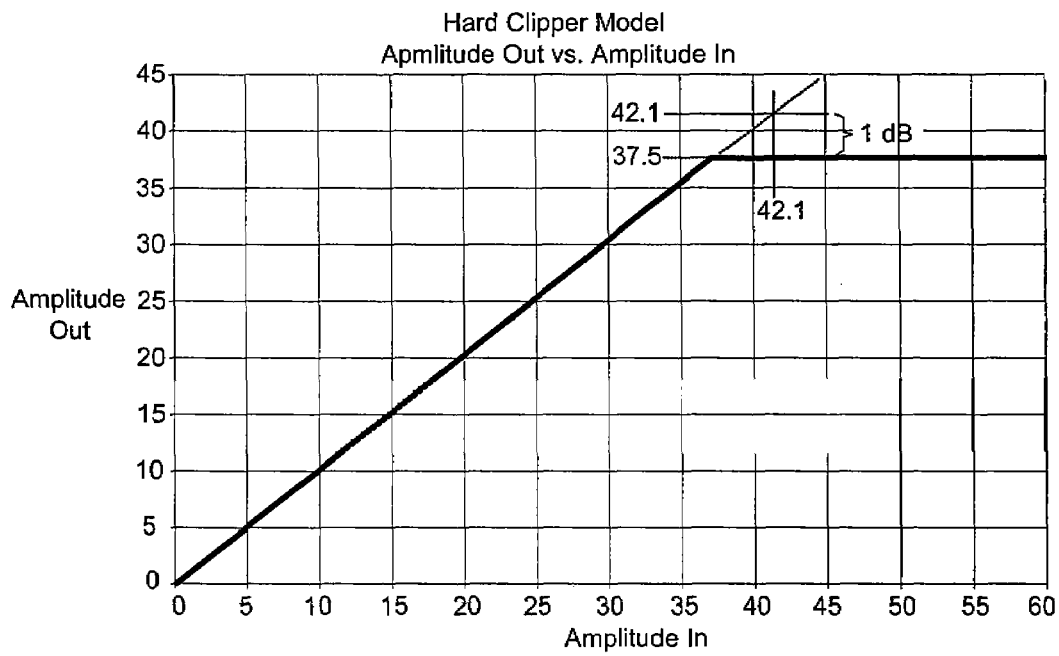
FIG. 2 is a hard limited saturation transfer function of a Block Up Converter (BUC)

FIG. 2 is a hard limited saturation transfer function of a BUC, and illustrates an amplitude input to output transfer function of an unmodulated carrier wave. The transfer function is with respect to the amplitude, such as an input and an output voltage.

The saturation point corresponds to a 0 dB input backoff (IBO). The 0 dB input back off is defined as the input point where the output is 1 dB compressed (or below) the expected output point had the BUC been perfectly linear. This point corresponds to an input at 42.1 units.

The transfer curve of FIG. 2 corresponds to an unmodulated carrier. Actual communication signals, however, are typically modulated. For example, a QPSK (or 8-ary) modulated signal, filtered with a 25% root raised cosine filter, has an amplitude that is dependent on the data. These fluctuations in amplitude are "clipped" as per the non-linearity resulting in the signal distortion. This is depicted in FIG. 3, which is a graph of an RMS output amplitude to an RMS input amplitude of a modulated signal passed through the hard limited saturation transfer function of FIG. 2.

Figure 3:
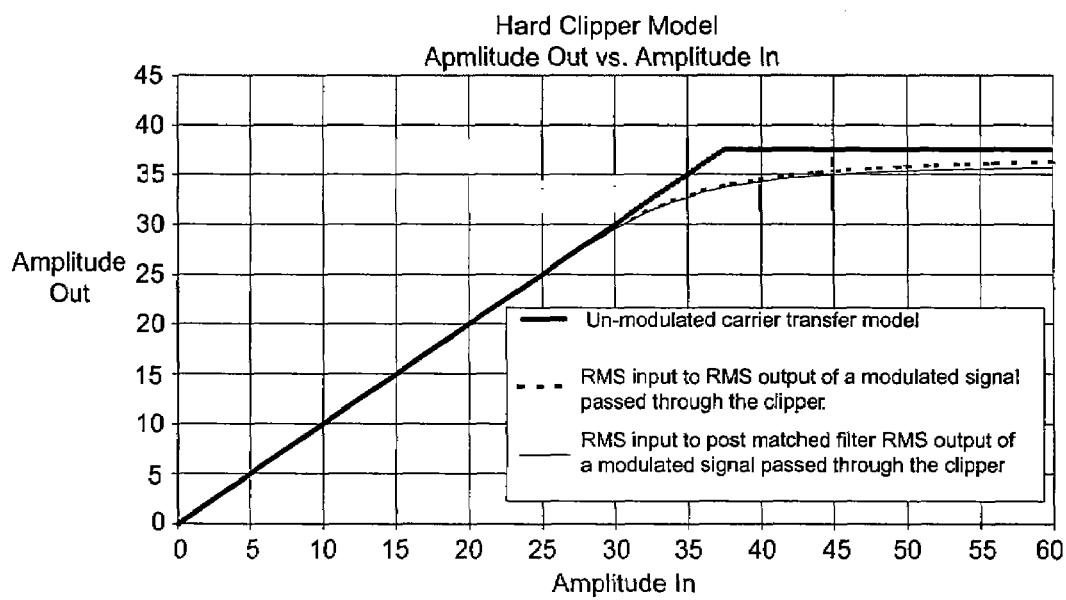
FIG. 3 is a graph of an RMS output amplitude to an RMS input amplitude of a modulated signal passed through the hard limited saturation transfer function of FIG. 2.

An optimum drive level of the BUC may be determined from FIG. 3. The optimum drive level is the optimum IBO operating point level where maximum signal-to-noise ratio (SNR) is achieved at the hub receiver. Increasing the signal strength, given a relatively fixed noise level at the receiver, maximizes the SNR. FIG. 3 illustrates that the output amplitude, and thus power, increases monotonically with increasing input power. Additionally, after match filtering, the received signal amplitude, and thus power, increases monotonically with increasing input power.

However, driving the input power to a maximum at the BUC will not necessarily result in achieving a maximum SNR at the receiver for at least three reasons. First, the "hard limiter" transfer models of FIGS. 2 and 3 are only a first order approximation of the transfer function and thus the output amplitude is constant for increasing input amplitude after the knee in the transfer curve. In an actual BUC, the output amplitude may actually drop slightly, or even significantly, for increasing input amplitude beyond the knee or the 0 dB back off point. Second, the non-linearity distorts the signal resulting in inner symbol interference (ISI), which adds an effective "noise" term at the receiver. Third, clipping the signal results in spectral re-growth, or excessive out-of-band power. While spectral re-growth does not degrade the channel over which the BUC is operating, it does add noise to adjacent channels, causing adjacent channel interference (ACI).

Figure 4:
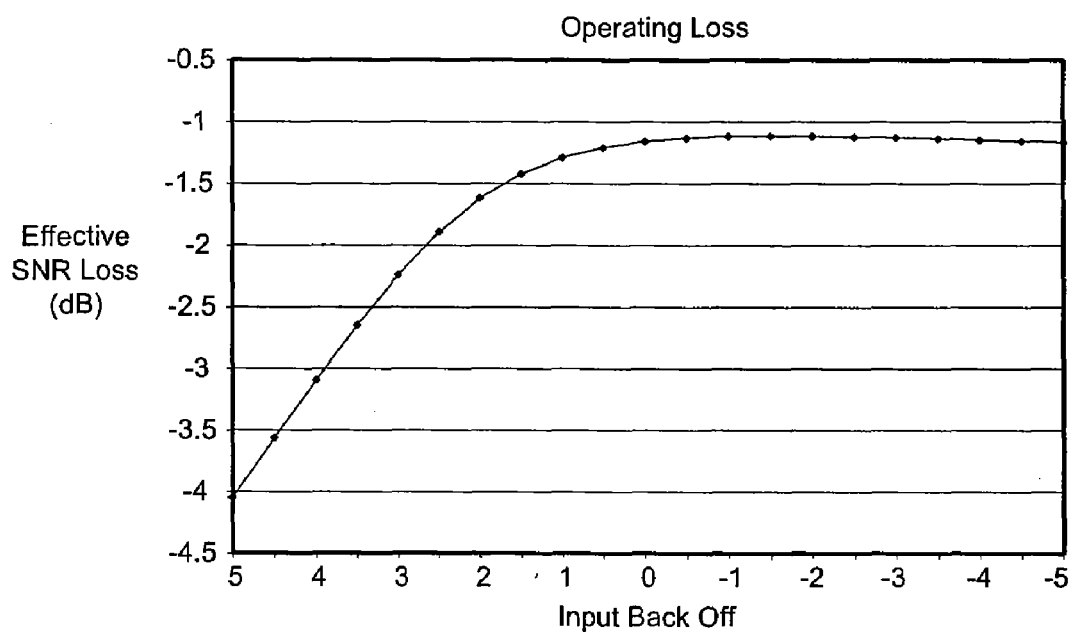
FIGS. 4 and 5 are graphs of effective SNR loss as a function of Input Back Off (IBO) for the hard limited saturation transfer function of FIG. 2 using QPSK modulation.

Considering the case where all channels are operating similarly, the optimum drive level for obtaining the maximum SNR is determined and selected as an operating point. The loss as a function of IBO is calculated as a function of the modulation and coding used in the communication signal. In the case of a QPSK with a rate 0.66 Turbo Product Code (TPC), for example, the receiver needs an Es/No of 4.4 dB to close the link. This is a fairly low Es/No and as such the receiver can tolerate a fair amount of ISI and ACI. FIG. 4 is a graph of the effective SNR loss as a function of IBO for the hard limited saturation transfer function of FIG. 2. FIG. 4 is dependent on ACI, the reduced power an increase in IBO causes, and the ISI generated by the non-linearity.

Figure 5:
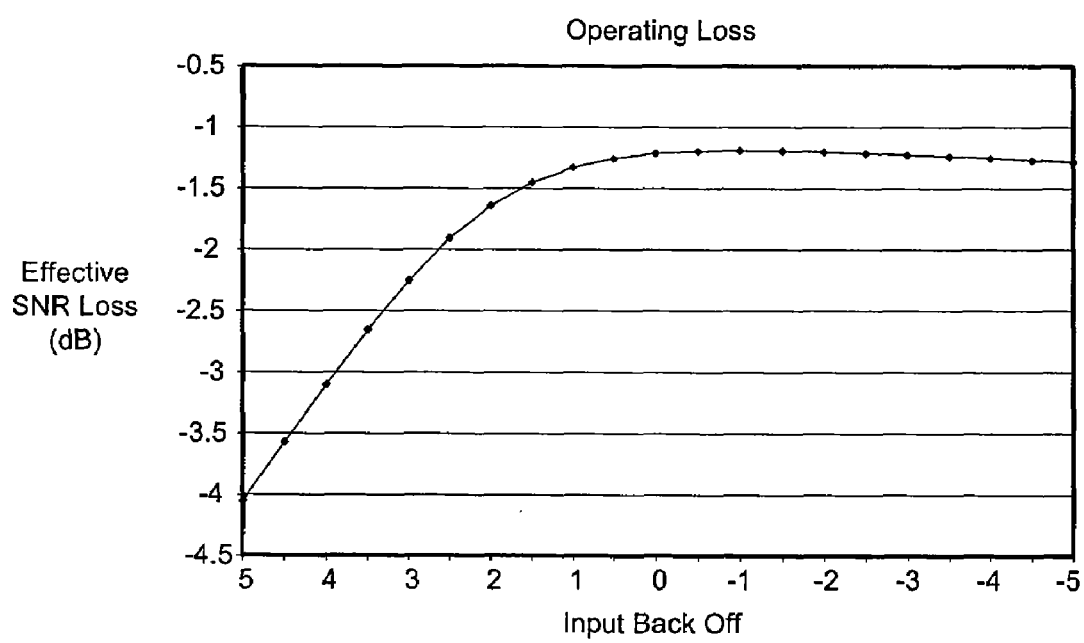

FIG. 4 shows a total loss of ~1.1 dB at an optimum operating point of −1.5 dB IBO. FIG. 5 is a similar graph for a QPSK with a rate of 0.79321 TPC requiring an Es/No of 5.2 dB. FIG. 5 shows a total loss of 1.2 dB at an optimum operating point of −1 dB IBO.

FIGS. 4 and 5 illustrate that the effective loss is largely constant from an IBO of roughly +0.5 dB and below. For the ideal hard limited BUC transfer function of FIG. 2, overdriving the BUC beyond +0.5 dB IBO into the negative IBO region results in no real improvement in received signal SNR. An actual BUC exhibits a drop in output power with increasing input power or different amplitude and/or phase transfer characteristics that results in greater ISI, ACI, or other interference or noise. Accordingly, depending on the particular BUC in use, and possibly other particular system control issues, the optimal IBO may be in the positive or negative range. A typical system and BUC may result in setting +0.5 dB IBO as the optimum operating point and can accommodate a variety of BUC devices for QPSK modulation with code rates in the range of 0.66 through 0.79321. More accurate determinations may be obtained by empirical data of particular BUC devices; however, the selected setting, based on the ideal transfer function of FIG. 2, yields adequate results for a wide range of BUC devices.

Other modulations may require a different IBO as an optimum operating point. For example, an 8-ary modulation and a higher code rate will require a higher operating Es/No, which lowers the tolerance to ACI and ISI. Additionally, the constellation peak to average power ratio may be 0.58 dB for one 8-ary modulation format, while the constellation peak to average power ratio is 0.0 dB for QPSK. Thus, the filtered waveform peak to average power is roughly 0.5 dB higher for this 8-ary than for QPSK.

Figure 6:
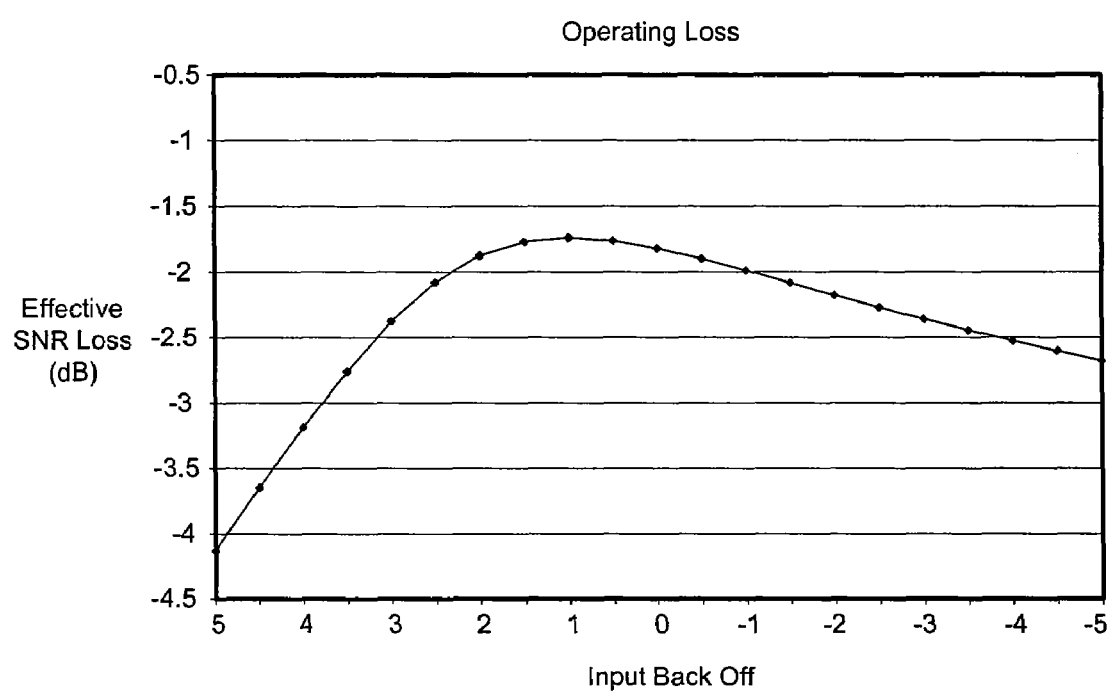
FIG. 6 is a graph of the effective SNR loss as a function of IBO for the hard limited saturation transfer function of FIG. 2 using 8-ary modulation.

FIG. 6 is a graph of the effective SNR loss as a function of IBO for the hard limited saturation transfer function of FIG. 2 using an 8-ary modulation. The 8-ary modulation and coding combination is more sensitive to distortion caused by the non-linearity. The optimal operating point is +1 dB IBO. Again, FIG. 6 is based on the ideal hard limiter BUC model of FIG. 2, and an actual BUC likely exhibits slightly more distortion in saturation. Accordingly, an operating point of +1.5 dB IBO for the 8-ary mode of operation may be selected as the optimal operating point. More accurate determinations may be obtained by empirical data of particular BUC devices; however, the selected setting based on the ideal transfer function of FIG. 2 yields adequate results for a wide range of BUC devices.

While QPSK and 8-ary modulation examples are described above, other modulation formats may also be used. Accordingly, different IBO operating points can be selected, depending on the particular modulation format implemented.

Given a selected optimum operating point, a receiver-based saturation estimator estimates the IBO about the operating point. For example, the receiver may be configured to accurately estimate BUC operation from the +3 dB IBO (linear operation) to −2 dB IBO (heavily saturated operation). The receiver may be further configured to estimate IBO to an accuracy of +/−1 dB in the +3 dB to −2 dB IBO range. This particular accuracy level allows for a determination of effective SNR loss of about 0.25 dB maximum.

Figure 7:
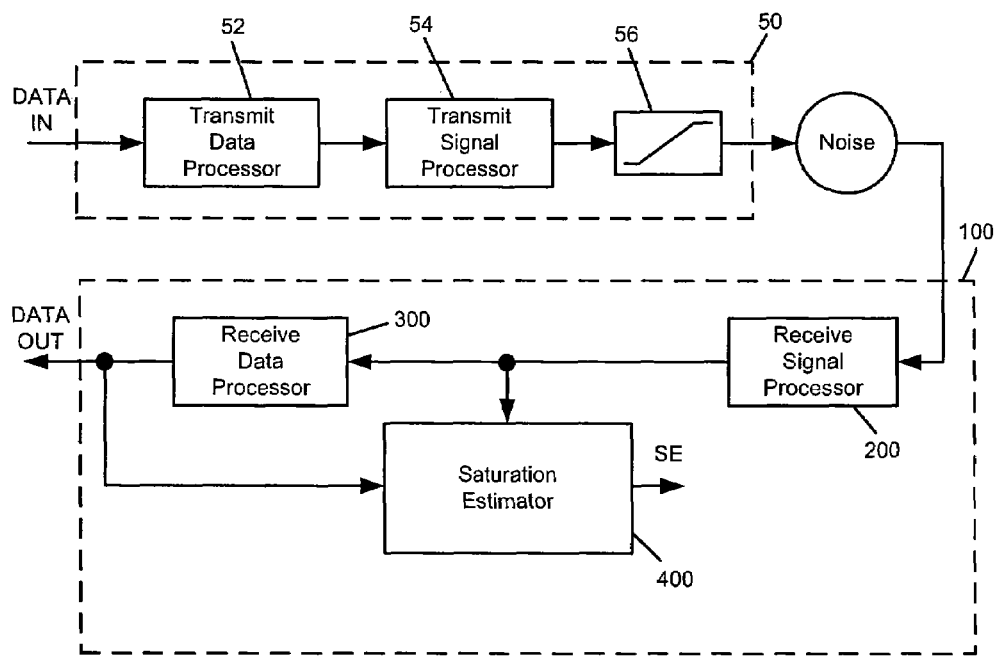
FIG. 7 is a block diagram of a receiver-based saturation estimator system.

FIG. 7 is a block diagram of a receiver-based saturation estimator system. The receiver-based saturation estimator system comprises a receiver 100 including a receive signal processor 200, a receive data processor 300, and a saturation estimator 400. For a digital communication system, each of the receive signal processor 200, receive data processor 300, and saturation estimator 400 may be implemented using analog and digital signal processing hardware and/or software. For example, the receive signal processor 200 may comprise an RF satellite receiver and associated digital signal processing circuitry and associated software, and the receive data processor 300 and the saturation estimator 400 may likewise comprise digital signal processing circuitry and associated software. The processing circuitry may comprise one or more microprocessors, application-specific integrated circuits (ASICs), field programmable gate arrays (FPGAs), or other devices operable to be configured to implement the systems and/or methods described herein.

Additionally, while the embodiment of FIG. 7 and other embodiments in this disclosure depict separate blocks, the systems and methods described herein may be implemented in a single software or hardware device, or a plurality of software and hardware devices. Thus, while separate functional or structural blocks are used to illustrate the systems and methods described herein, the systems and methods described herein may be implemented in more, or fewer, functional or structural blocks.

The receiver 100 receives a transmitted communication signal from transmitter 50. In a satellite communication system, the transmitter 50 may comprise a BUC, and the receiver-based saturation estimator system may comprise a hub receiver.

Within the transmitter 50, a transmit data processor 52 receives and processes data for transmission and outputs a data signal to be transmitted. The transmit data processor 52 may comprise digital signal processing circuitry and/or software operable to encode the digital data into a suitable format for transmission over an RF link, such as BPSK, QPSK, M-ary PSK, or other such modulation formats. The transmit data processor may also provide coding for error detection, error correction, or both.

The transmit signal processor 54 receives the data signal to be transmitted and modulates the data signal to produce a communication signal. The modulation may include upsampling and filtering, for example. The communication signal is then provided to a transmission subsystem 56, such as a burst transmitter, which may be operating in a linear, unsaturated region or non-linear, saturated region. If the transmission subsystem 56 is operating in the latter region, then the communication signal is typically distorted due to the non-linear response of the transmitter as described above.

The transmitted communication signal is then transmitted and received by the receive signal processor 200 of the receiver 100. During transmission, the transmitted signal may degrade due to noise caused by propagation losses, ACI, ICI, or any other source of communication noise. The receive signal processor 200 receives and demodulates the transmitted communication signal and outputs a received data signal. The received data signal is then decoded by the receive data processor 300 to recover the data.

The recovered data and the received data signal are then input into the saturation estimator 400 which processes the data and the received data signal to estimate the degree of saturation at which the transmission subsystem 56 is operating. Depending on the saturation estimation, the saturation estimator 400 may transmit an instruction to the transmission subsystem 56 to increase transmit power, decrease transmit power, or decrease the signal data rate. For example, if the link quality between the receiver 100 and the transmitter 50 is high, but the transmitter is operating at saturation, the receiver may instruct the transmitter to reduce its transmit power. Conversely, if the link quality between the receiver 100 and the transmitter 50 is low, and the transmitter is operating below saturation, the receiver 100 may instruct the transmitter 50 to increase its transmit power. Likewise, if the link quality between the receiver 100 and the transmitter 50 is low, and the transmitter is operating at or above saturation, the receiver 100 may instruct the transmitter 50 to decrease its data rate to maintain the link, as increasing the transmit power will likely not result in an increase in link quality.

The saturation estimator 400 may comprise a memory store that stores data related to the transfer function of the transmitter 50. For example, the saturation estimator 400 may store transfer function data related to the graphs of FIGS. 2 and 3, and accesses this data to estimate the saturation level at which the transmission subsystems 56 is operating.

In one embodiment, the saturation level is estimated by comparing the received data signal to the transmitted data signal. The transmitted data signal corresponds to the actual data signal generated at the transmitter 50 and is generated in the saturation estimator 400 by performing transmit data processing on the data output by the receive data processor 300. The transmitted data signal may be an exact replica of the data signal generated at the transmitter 50, or may closely approximate the actual data signal generated at the transmitter 50, depending on errors. Thus, if the recovered data is correct, the actual data signal output by the transmit data processor 52 of the transmitter 50 can be recreated and compared to the received data signal to estimate the saturation level of the transmitter 50. Alternatively, if the recovered data signal is incorrect, e.g., a transmission error is not corrected by error correction or the signal processing does not include error correction, then the transmitted data signal may still closely approximate the actual data signal, depending on the severity of the data error, and can be compared to the received data signal to estimate the saturation level of the transmitter 50. In this latter case, however, the saturation estimation may be less accurate due to errors in the transmitted data signal that corresponds to the actual data signal.

Figure 8:
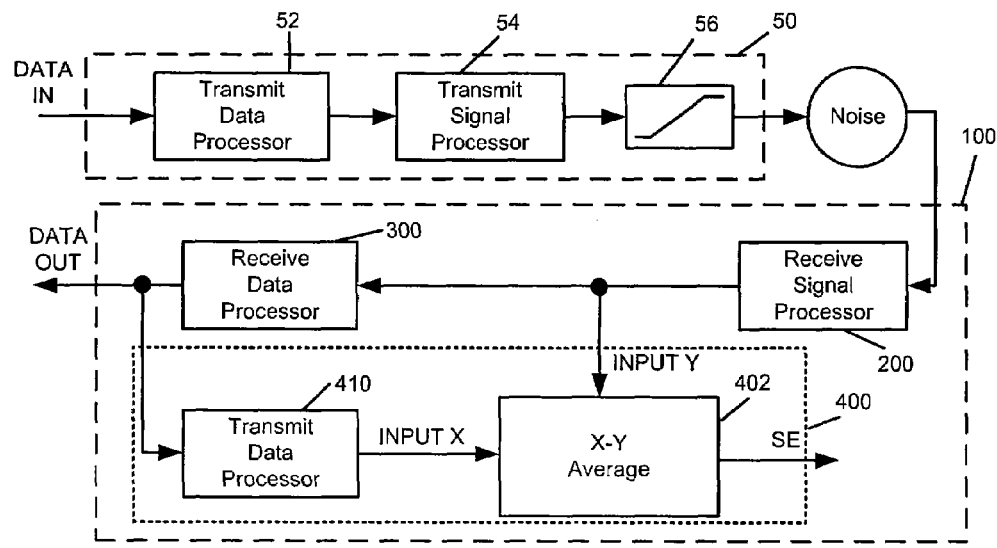
FIG. 8 is a block diagram of a first embodiment of the receiver-based saturation estimator system.

FIG. 8 is a block diagram of a first embodiment of the receiver-based saturation estimator system. The transmit data processor 52, transmit signal processor 54, transmission subsystem 56, receive signal processor 200, and receive data processor 300 are the same as described with respect to FIG. 7.

In this embodiment, the saturation estimator 400 comprises an X-Y averaging processor 402 and a transmit data processor 410, each of which may be implemented using analog and digital signal processing hardware and/or software. The transmit data processor 410 performs similar data processing to the transmit data processor 52 of the transmitter 50 to produce a transmitted data signal that corresponds to the actual data signal generated at the output of the transmit data processor 52. Accordingly, for error-free recovered data, the transmitted data signal output by the transmit data processor 410 is the same as the actual data signal output by the transmit data processor 52 of the transmitter 50.

The X-Y averaging processor 402 compares the transmitted data signal output by the transmit data processor 410 to the received data signal output by the receive signal processor 200. In one embodiment, the transmitted data signal output by the transmit data processor 410 is used as an X-axis data value, and the received data signal output by the receive signal processor 200 is used as a Y-axis data value. The differences in the reconstructed transmitted data signal and the received data signal are primarily caused by noise and transmitter non-linearity. Because the noise may be considered a random event, averaging of the data minimizes the noise distortion and also allows for measurement of the transmitter non-linearity.

Thus, by comparing the magnitudes of these data values over time, an estimation of the transmitter saturation level may be obtained. For example, in a QPSK signal, the amplitude of the signal depends on the data modulated. Thus, relatively equal magnitudes over the entire range of data indicate that the transmitter is operating in a linear region. Conversely, a lower relative magnitude for the received data signal at the higher amplitudes as compared to the transmitted data signal indicates that the transmitter 50 is operating with some degree of saturation. The degree of saturation is determined by the amplitude mismatch, e.g., a 1 dB compression indicates that the transmitter 50 has reached the saturation point, a 3 dB compression indicates that the transmitter is heavily saturated, etc.

Figure 9:
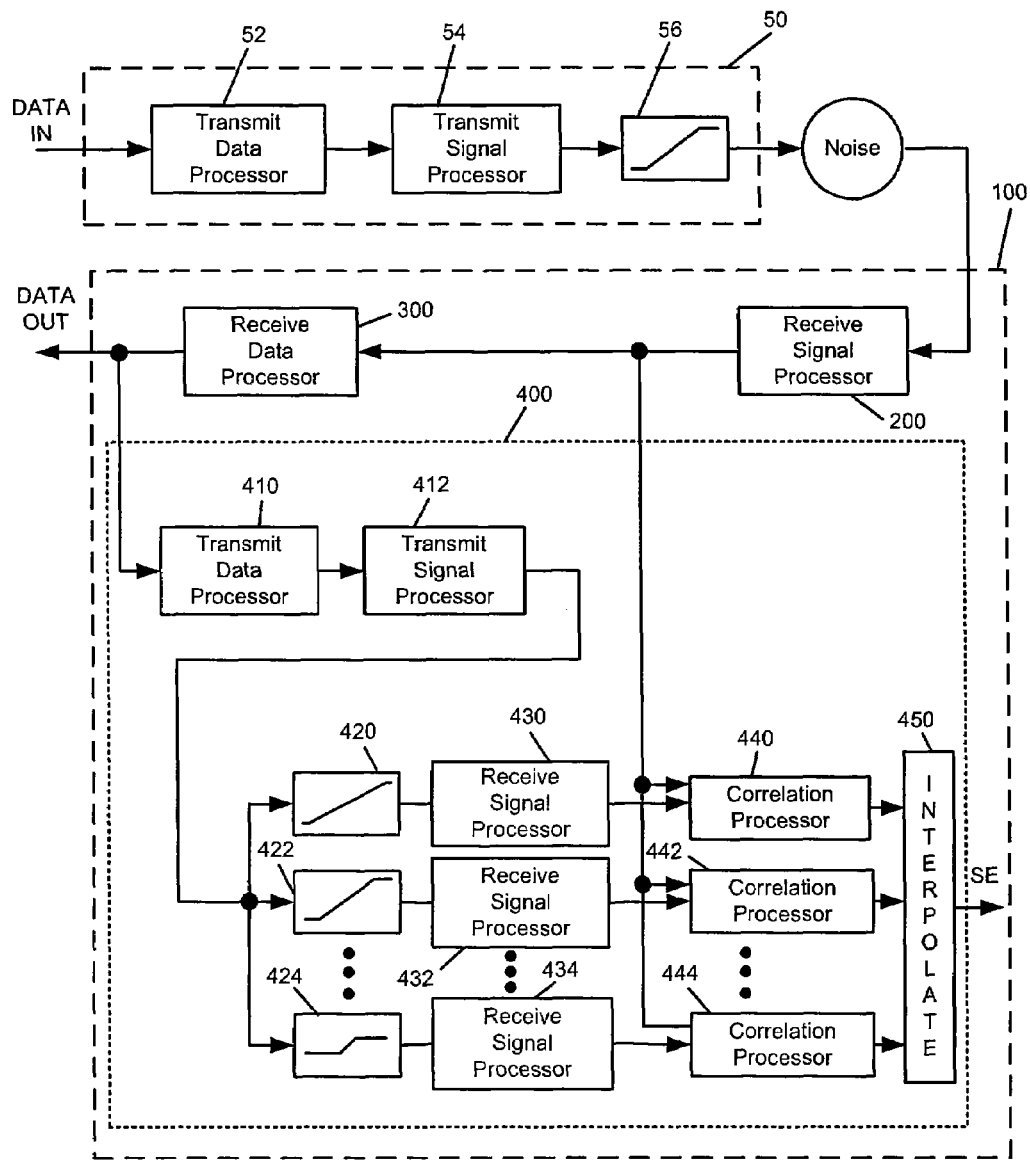
FIG. 9 is a block diagram of another embodiment of the receiver-based saturation estimator system.

FIG. 9 is a block diagram of another embodiment of the receiver-based saturation estimator system. The transmit data processor 52, transmit signal processor 54, transmission subsystem 56, receive signal processor 200, and receive data processor 300 are the same as described with respect to FIGS. 7 and 8 above.

In this embodiment, the saturation estimator 400 determines the saturation level of the transmitter 50 by correlating the received data signal output by the receive signal processor 200 with a plurality of estimated received data signals. Each correlation output corresponds to a saturation level, and the saturation level is determined by interpolation between two or more correlation output values.

The saturation estimator 400 of FIG. 9 comprises a transmit data processor 410 and a transmit signal processor 412, each of which may be implemented using analog and digital signal processing hardware and/or software. The transmit data processor 410 performs similar data processing to the transmit data processor 52 of the transmitter 50 to produce a transmitted data signal that corresponds to the actual data signal generated at the output of the transmit data processor 52. Likewise, the transmit signal processor 412 performs similar data processing to the transmit signal processor 54 of the transmitter 50 to produce a communication signal that corresponds to the actual communication signal generated at the output of the transmit signal processor 54 of the transmitter 50. Accordingly, for error-free recovered data, the communication signal output by the transmit signal processor 412 is the same as the communication signal output by the transmit signal processor 54 of the transmitter 50.

The communication signal output by the transmit signal processor 412 is provided to a plurality of transmitter saturation transfer functions 420, 422, and 424, each of which may be implemented using analog and/or digital signal processing hardware and/or software. Each transfer function 420, 422 and 424 provides a model of the transmission subsystem 56 of the transmitter 50 at a corresponding saturation level. For example, the transfer functions may cover the range of +5 dB IBO to −5 dB IBO in 1 dB increments. Other ranges and increments may also be used.

The transfer functions 420, 422, and 424 generate a plurality of estimated transmitted communication signals that correspond to the actual communication signal transmitted by the transmission subsystem 56 of the transmitter 50. Each of the estimated transmitted signals are, in turn, provided to a plurality of receive signal processors 430, 432 and 434 that may be implemented using analog and/or digital signal processing hardware and/or software.

Each of the receive signal processors 430, 432 and 434 performs signal processing similar to the receive signal processor 200 to produce an estimated received data signal. Random noise effects may be ignored in the receive signal processors 430, 432 and 434 because each of the receive signal processors 430, 432 and 434 are configured to generate an estimated transmitted communication signal that corresponds to the actual communication signal transmitted by the transmission subsystem 56 of the transmitter 50. However, in another embodiment, noise distortion may be added.

Each of the estimated received data signals are correlated with the received data signal by a plurality of correlation processors 440, 442, and 444, each of which may be implemented using analog and/or digital signal processing hardware and/or software. Each of the correlation processors 440, 442, and 444 generate a correlation coefficient corresponding to a cross-correlation of an estimated received data signal to the actual received data signal output by the receive signal processor 200. Each of these resultant correlation coefficients corresponds to a saturation level of the transfer functions 420, 422 and 424.

An interpolation processor 450 may be used to interpolate between at least two correlation coefficients to determine the saturation level. The interpolation processor 450 may be implemented using analog and/or digital signal processing hardware and/or software. In one embodiment, the interpolation processor 450 interpolates between the highest correlation coefficient and at least one other adjacent correlation coefficient to estimate the saturation level of the transmitter 50.

In another embodiment, the interpolation processor 450 is not implemented. Instead, the saturation level corresponding to the highest correlation coefficient is selected as the saturation level estimate of the transmitter 50.

Figure 10:
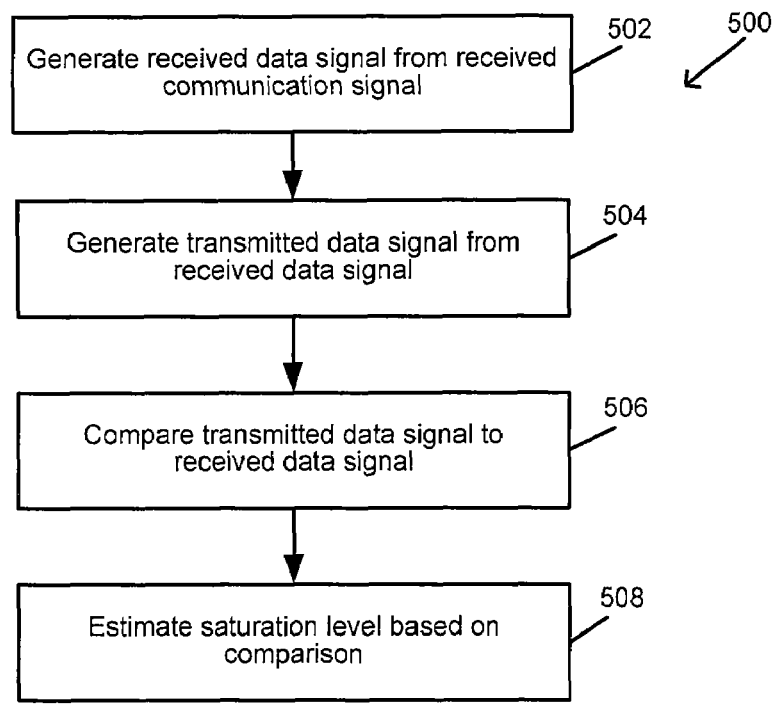
FIG. 10 is a flow chart of a process for estimating the saturation level of a transmitter from a communication signal received from the transmitter.

FIG. 10 is a flow chart 500 of a process for estimating the saturation level of a transmitter from a communication signal received from the transmitter. The process of FIG. 10 is typically implemented in a receive-end processor or processing system. In step 502, a received data signal from a received data communication signal is generated. In a digital communication system, the received data signal may be a symbol sequence for a digital modulation scheme. The received data signal is typically distorted by any non-linearity of the transmitter, and may be further distorted by background noise.

In step 504, a transmitted data signal from the received data signal is generated. The transmitted data signal 504 corresponds to the actual data signal generated in the transmitter, and is a reconstruction of the data signal generated at the transmitter and transmitted to the receiver. In one embodiment, the transmitted data signal is generated by decoding the received data signal and performing error correction and detection. If the decoded data is error-free, then the transmitted data signal is generated by modulating the data according to the modulation scheme implemented in the transmitter.

In step 506, the transmitted data signal is compared to the received data signal. This step may include an X-Y averaging comparison, or a correlation comparison. Other comparison methods may also be used.

In step 508, the saturation level of the transmitter is determined based on the comparison performed in step 506. This step may include matching the resultant data from an X-Y averaging comparison to one of a plurality of transfer functions of the transmitter, or may include an interpolation between two or more correlation comparisons. Other saturation level determinations may also be used.

Figure 11:
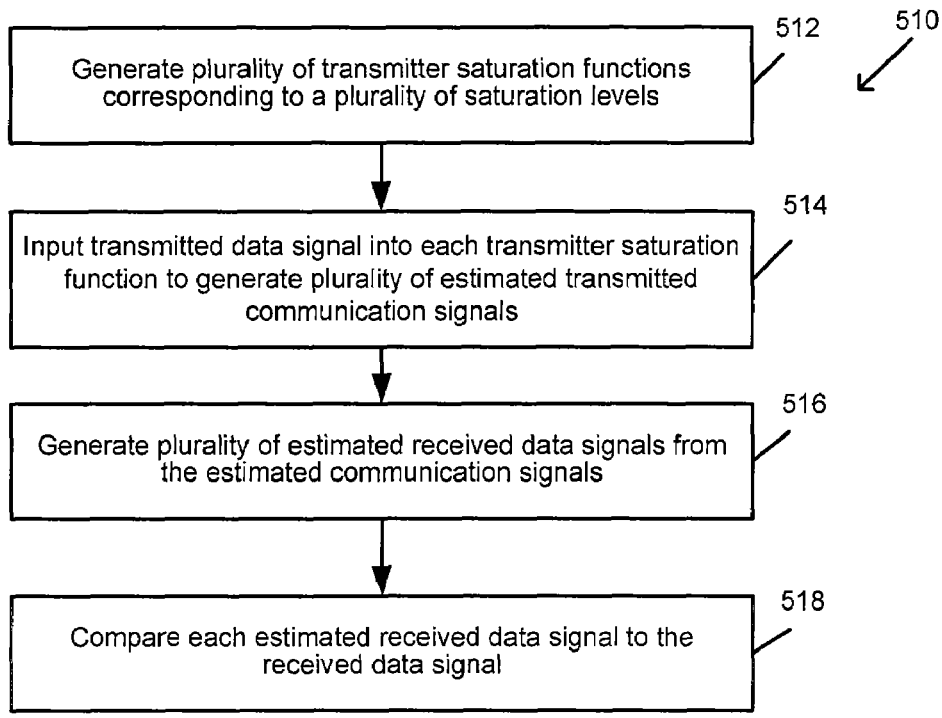
FIG. 11 is a flow chart of a process for comparing a transmitted data signal to a received data signal.

FIG. 11 is a flow chart 510 of a process for comparing a transmitted data signal to a received data signal. In step 512, a plurality of transmitter saturation functions corresponding to a plurality of saturation levels is generated. In one embodiment, the plurality of transmitter saturation functions is based on an ideal transfer function. In another embodiment, the plurality of transmitter saturation functions is based on actual performance data of one or more transmitters.

In step 514, the transmitted data signal generated in the receiver is input into each transmitter saturation function to generate a plurality of estimated transmitted communication signals. In step 516, the plurality of estimated transmitted communication signals are processed in a similar manner as the actual received communication signal to generate a plurality of estimated received data signals. Finally, in step 518, each estimated received data signal is compared to the received data signal to determine which estimated received data signal is most indicative of the received data signal.

Figure 12:
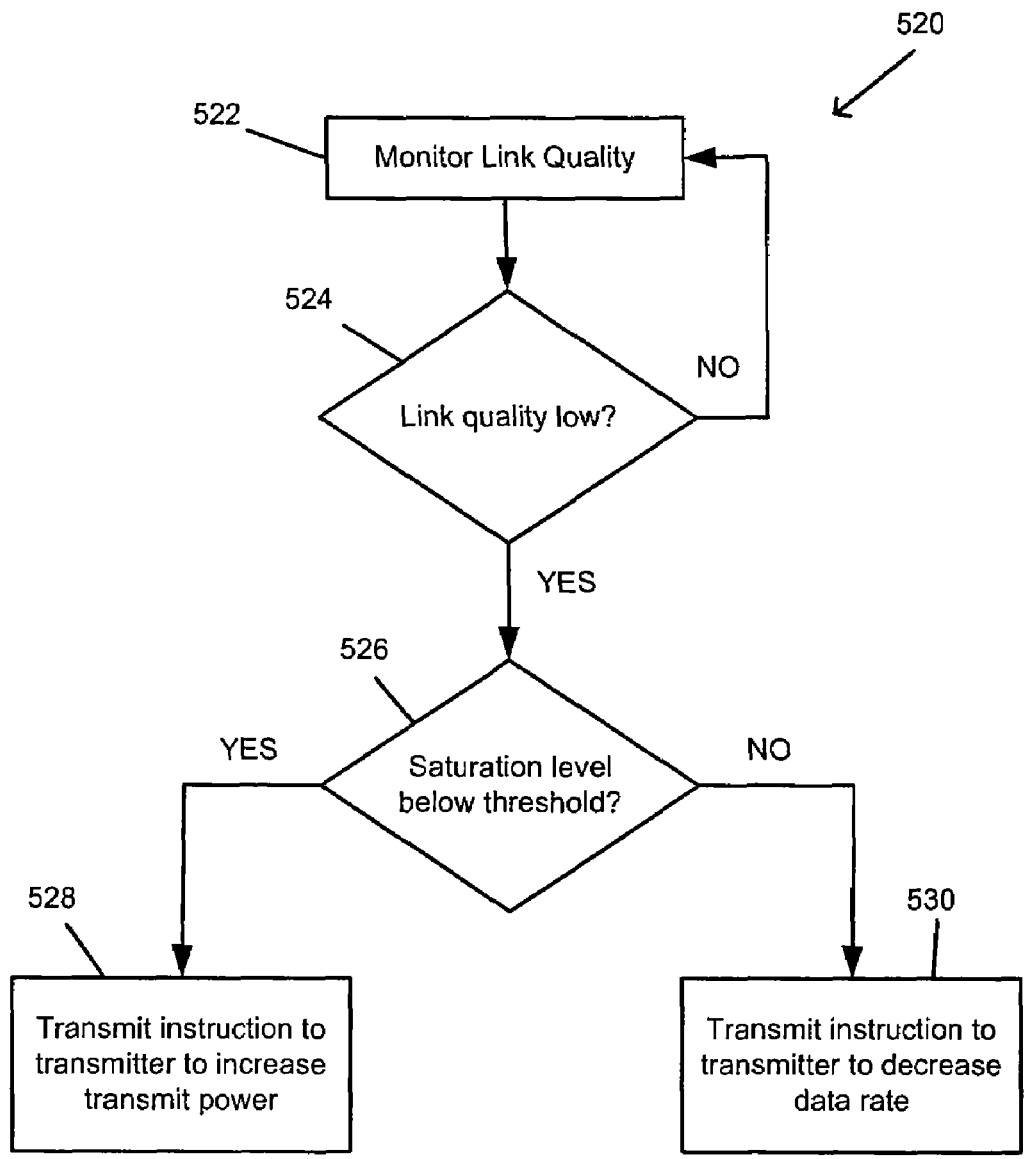
FIG. 12 is a flow diagram of a receiver-based process for controlling a transmitter to maintain a link, subject to the saturation level of the transmitter.

By estimating the saturation level, the receiver system may control the transmitter via an instruction transmission to properly maintain the communication link. FIG. 12 is a flow diagram 520 of a receiver-based process for controlling a transmitter to maintain a link, subject to the saturation level of the transmitter. In step 522, the receiver system monitors the link quality. In step 524, the receiver determines if the link quality is low, e.g., whether the link is fading out due to a low SNR, or whether the link quality is such that there is an unacceptable probability that the signal may be lost or an error rate exceeded.

If the link quality is not low, then in step 522 the receiver system continues to monitor the link quality. If, however, the link quality is low, the receiver system then determines if the saturation level of the transmitter is below a threshold in step 526. The threshold may be selected as a particular saturation level, e.g., 0 dB IBO, or −1 dB IBO, etc., or may be dynamic depending on the overall system configuration.

If the saturation level of the transmitter is below the threshold, then the transmit power of the transmitter may be increased without unacceptable deleterious effects of saturation. Thus, in step 528, the receiver system transmits a signal to the transmitter instructing the transmitter to increase its transmit power.

If, however, the saturation level of the transmitter is above the threshold, then the transmit power of the transmitter may not be increased without unacceptable deleterious effects of saturation. Accordingly, in step 530, the receiver transmits a signal to the transmitter instructing the transmitter to decrease its data rate to maintain the link quality.

The receiver may transmit the signal to the transmitter over a return RF link. Alternatively, the receive may transmit the signal to the transmitter over network, such as the Internet or other data communication system.

Figure 13:
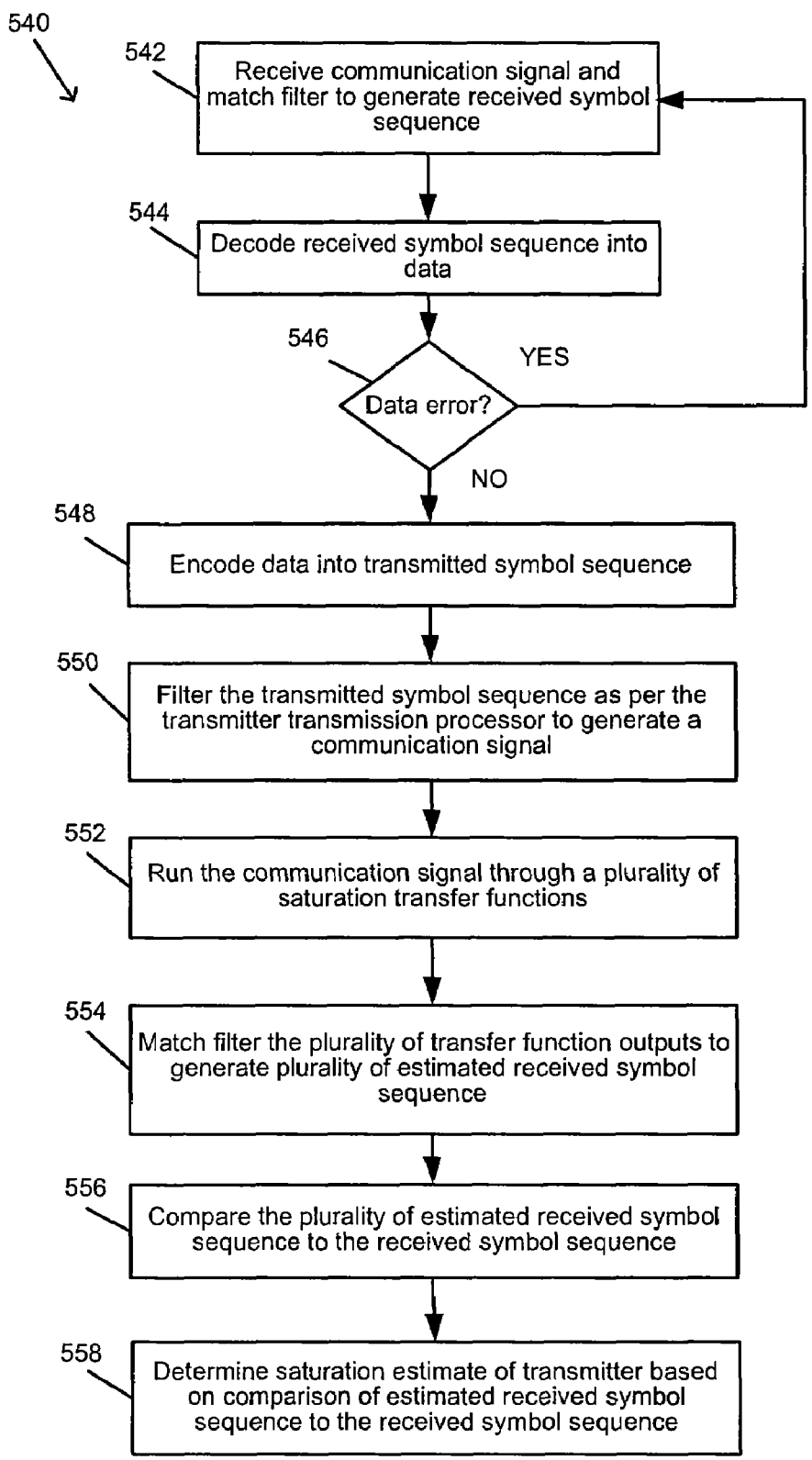
FIG. 13 is a flow chart of another process for estimating the saturation level of a transmitter from a communication signal received from the transmitter.

FIG. 13 is a flow chart 540 of another process for estimating the saturation level of a transmitter from a communication signal received from the transmitter. In this embodiment, an error detection scheme is used in conjunction with a QPSK (8-ary) digital modulation scheme. Other digital modulation schemes may also be used.

In step 542, a transmitted communication signal is received and match filtered to generate a received symbol sequence.

Step 544 decodes the received symbol sequence into recovered data, and step 546 determines if the data is error-free. If the data is not error-free, then the process returns to step 542 to receive and decode the next received communication signal.

However, if the data is error-free, then step 548 encodes the data into the transmitted symbol sequence. Typically, the encoding scheme in step 548 is the same encoding scheme as used in the transmitter that transmitted the communication signal. Other encoding schemes that produce the same encoded data for a given data set may also be used.

Step 550 then processes the transmitted symbol sequence as per the transmitter transmission processing to produce a communication signal similar to the communication signal produced at the transmitter for transmission. In a similar manner to that of step 548, step 550 performs transmission processing similar to the transmission processing performed in the transmitter. For example, if the transmitter upsamples the transmitted symbol sequence at a particular rate and filters the upsampled symbol sequence through a particular pulse shape filter, then step 550 likewise upsamples the transmitted symbol sequence at the particular rate and filters the upsampled symbol sequence through the particular pulse shape filter.

Step 552 runs the communication signal produced in step 550 through a plurality of saturation transfer functions. Each transfer function corresponds to a particular saturation level in the transmitter. The output signals produced by the plurality of saturation transfer functions are then match filtered to generate a plurality of estimated received symbol sequence. The match filtering is similar to the match filtering performed in step 542.

Step 556 then compares the plurality of estimated received symbol sequences to the received symbol sequence generated in step 542. The comparison may be implemented by X-Y averaging, cross-correlation, or by other comparison methods. Step 558 then determines a saturation estimation of the transmitter based on the comparison of the estimated received symbol sequences to the received symbol sequence. The saturation estimation may correspond directly to one of the comparisons of step 556, or may be a resultant estimate from further processing, such as an interpolation.

Figure 14:
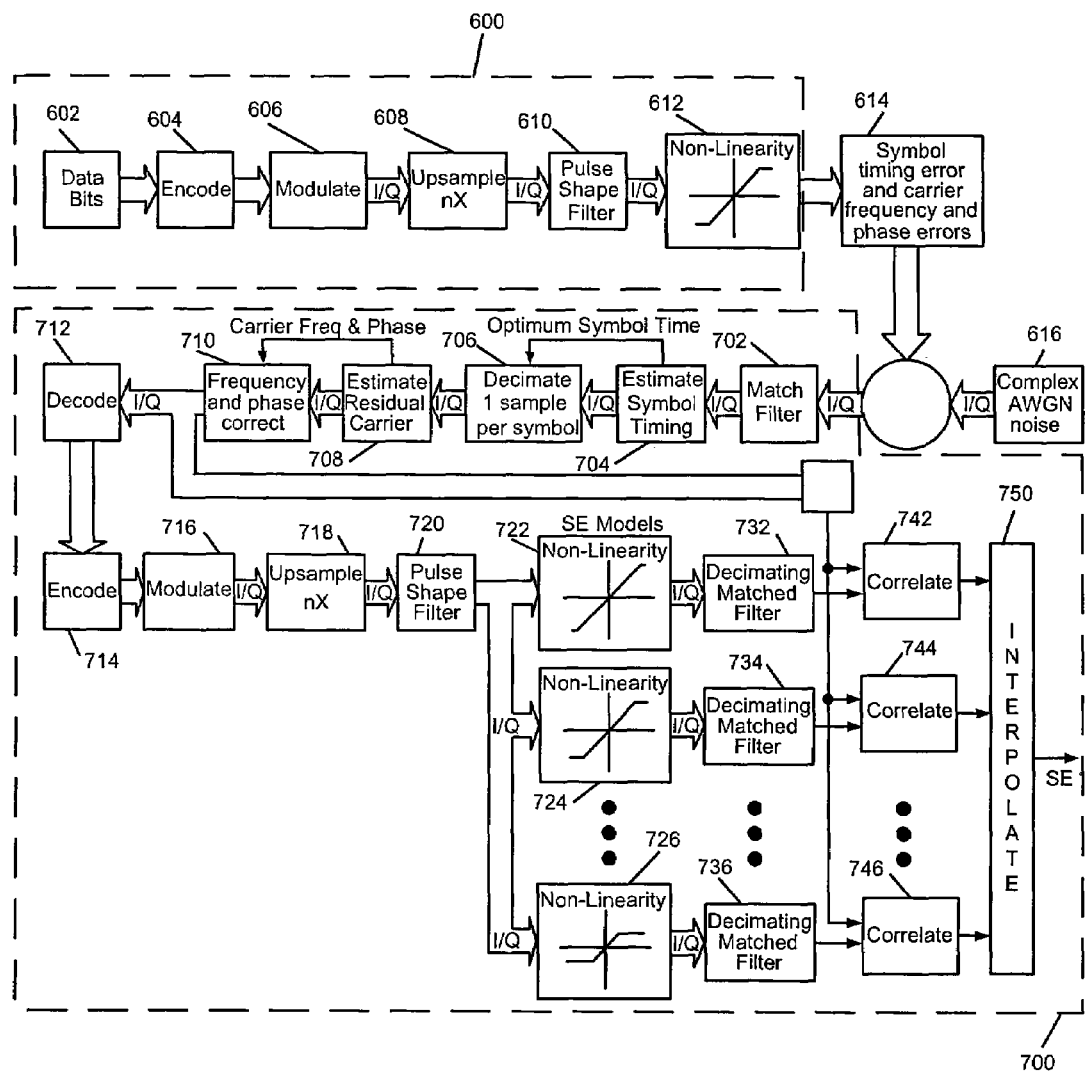
FIG. 14 is a block diagram of another embodiment of the receiver-based saturation estimator system.

FIG. 14 is a block diagram of another embodiment of the receiver-based saturation estimator system. Each of the processing blocks referred to in FIG. 14 may be implemented using analog and/or digital processing circuitry and corresponding software. The embodiment of FIG. 14 utilizes a matched filter. The matched filter adapts to the non-linearity because the matched filter depends on the data itself, e.g., the data signal distortion caused by the transmitter non-linearity depends on the data signal itself, which, in turn, depends on the data transmitted.

The architecture of FIG. 14 is applicable to both practical implementations and evaluations. For example, the architecture of FIG. 14 may be implemented in software to test receiver performance for various transmitter non-linearity characteristics. The various transmitter non-linearity characteristics may be provided by the manufacturer, collected through analysis and observation, or modeled ideally. Alternatively, a practical receiver may be implemented according to the receiver architecture illustrated in FIG. 14. Thus, transmitter data may be collected and receiver performance evaluated so that practical receiver implementations may be realized.

A transmitter 600, such as a BUC, receives data bits 602 to be transmitted to a receiver 700, such as a satellite hub receiver system. The encode process block 602 utilizes an error detection and correction encoding scheme to encode the data bits 602 for transmission. The modulation processing block 606 digitally modulates the encoded data bits 602 to generate a data signal to be transmitted.

The upsampling processing block 608 upsamples the data signal to be transmitted at a sampling rate of nX. For testing and evaluation, an upsampling rate of 16× provides a very robust oversampling evaluation. For other applications, an upsampling rate of 3× is sufficient to remove out-of-band $3^{rd}$ and $5^{th}$ order inner modulation products.

The upsampled signal from the upsampling processing block 608 is passed through a pulse shape filter block 610 to produce a communication signal to be transmitted. The communication signal is provided to a transmit amplifier block 612, which, depending on its operating conditions, may be operating in a linear range or a non-linear, saturation range. The transmit amplifier block 612 produces a transmitted communication signal that is transmitted to the receiver 700.

The transmitted communication signal is subsequently received by the receiver 700. At the receiver, the received signal has typically been corrupted by symbol timing errors, carrier phase errors, and frequency errors 614 caused by either the system and/or environment. Additionally, random noise 616, also caused by the system and/or environment, likewise results in degradation of the received communication signal.

Within the receiver 700, the received signal is match filtered by match filter block 702. The estimate symbol timing process block 704 and the decimation process block 706 implement processing to obtain an optimal symbol timing. Likewise, the estimate residual carrier process block 708 and the frequency and phase correct process block 710 implement processing to obtain the carrier frequency and phase. The frequency and phase correct processing block 710 outputs a received data signal. In the absence of errors, noise and saturation effects of the transmit amplifier 612, the received data signal would match the data signal to be transmitted output by encode processing block 604. Typically, however, signal degradation is present in the received symbol sequence output at the frequency and phase correct processing block 710.

The decode process block 712 decodes the received data signal to recover the data bits 602. Provided the data passes error detection, such as CRC, the data is then encoded in an encode processing block 714, modulated by modulation processing block 716, upsampled by upsampling processing block 718, and filtered by pulse shape filter processing block 720 to produce a communication signal. The encode processing block 714, modulation processing block 716, upsampling processing block 718, pulse shape filter processing block 720 operate in a similar manner to the encode processing block 604, modulation processing block 606, upsampling processing block 608, and pulse shape filter processing block 610 so that the communication signal produced at the output of the pulse shape filter processing block 720 corresponds to the communication signal output by the pulse shape filter processing block 610. The processing blocks in the receiver 700 need not operate identically to the processing blocks in the transmitter 600; rather, the processing blocks in the receiver 700 are configured to generate a corresponding communication signal to mimic the functional result of the corresponding blocks in the transmitter 600. Additionally, the upsampling factor in the transmitter 600 may be two or greater, or possibly even unity in some designs, depending on design.

The communication signal output by the pulse shape filter block 720 is provided to a plurality of non-linearity models 722, 724, and 726. The non-linearity models 722, 724 and 726 each correspond to transmitter saturation transfer functions at particular levels of saturation. Thus, each non-linearity model 722, 724, and 726 represents a corresponding saturation estimate. In one embodiment, the non-linearity models comprise levels ranging from 5 dB IBO to −5 dB IBO in 1 dB IBO increments.

Within the transmitter the signal is converted to an analog signal before final amplification and transmission. Thus, in one embodiment, the non-linearity is analyzed in the analog domain. The resulting output signal can, in principle, have an infinite range of frequencies. Within the receiver 700, the analog signal output of the receiver transmit amplifier 612 is thus mimicked at the outputs of the non-linearity blocks 722, 724, and 726. The upsampling factor in 718 is usually chosen to be small for computational efficiency but it needs to be large enough to accurately mimic the signal from 612. The upsampling factor in 718 can be as low as two, but at this level overall performance of the overall saturation estimator can be degraded, particularly in the "heavy saturation" range. An upsampling factor of three has found to be sufficient for most cases as it maintains the $3^{rd}$ and $5^{th}$ order harmonics generated by the non-linearity with sufficient accuracy.

Each of the non-linearity models 722, 724 and 726 produce an estimated transmitted communication signal. The estimated transmitted communication signals are filtered using decimating match filters 732, 734 and 736 to obtain a plurality of estimated received data signals. Given symbol timing errors, the outputs corresponding to the output of block 702. In the absence of symbol timing errors, the outputs correspond to the outputs of block 710. The decimating match filters 732, 734 and 736 are used for computational efficiency. To maintain maximum performance, the estimated transmitted communication signals may be decimated to twice the symbol rate. However, the 3 dB point of the matched filters 732, 734 and 736 is at half the symbol rate and these filters have a rapid roll off. Accordingly, with only a slight loss of performance, the decimating match filters 732, 734 and 736 may decimate to the symbol rate. The decimation sample point is consistent with the symbol timing recovery, and thus is at the optimal sampling point.

In another embodiment, a look-up table for the outputs of the decimating matched filters may be implemented. Note that the output of encode processing block 714 is in the form of bits which are ultimately taken n at a time to generate modulated symbols, where n is the order of the modulation, e.g., 2 for QPSK, 3 for 8-ary, etc. Additionally, the outputs of the decimating matched filters 732, 734, and 736 are symbols. As a result, there is a correspondence between the bit sequence and the symbols output of the decimation matched filters 732, 734, and 736. Using the bits corresponding to a symbol, along with the bits corresponding to the X number of symbols before and the X number of symbols after the symbol in question, the outputs of the decimation matched filters 732, 734, and 736 can be estimated by a look up table. The accuracy is a function of X.

Each of the estimated received data signals is then correlated with the actual received data signal by correlate processing blocks 742, 744, and 746. Each correlate processing block 742, 744 and 746 corresponds to a saturation estimate for each of the non-linearity models 722, 724, and 726, respectively. Accordingly, a saturation estimation may be determined by selecting the correlate processing block 742, 744 and 746 with the highest correlation coefficient output. Alternatively, the saturation estimate may be determined by interpolating among the correlation coefficients in the interpolation processing block 750. The interpolation processing block 750 may implement any interpolation algorithm, such as a polynomial curve fit algorithm.

The correlation processing blocks 742, 744 and 746 compare the received data signal to the estimated received data signals (or "postulated signals"). Because the non-linearity distorts the actual data signal, the RMS amplitude of the signal may likewise change. Thus, gain on the received signal is adjusted to minimize the squared error between the received signal and the postulated signals. The squared error may be expressed as:

$$E^2 = \sum_i (R_{I,i} - \alpha P_{I,i})^2 + (R_{Q,i} - \alpha P_{Q,i})^2$$

Where:

$E^2$ is the squared error between the received signal and the postulated signal;

i is the time (or symbol) index over the burst. (For a 512 symbol packet, i runs from 0 to 511);

$R_{I,i}$ is the In-Phase component of the received signal at time i;

$R_{Q,i}$ is the Quadrature component of the received signal at time i;

$P_{I,i}$ is the In-Phase component of the postulated signal at time i;

$P_{Q,i}$ is the Quadrature component of the postulated signal at time i; and

α a is an arbitrary gain constant.

The value of α which minimizes $E^2$ is used to eliminate variations in gain due to distortion induced by the non-linearity. Note that if the received sequence R is equal to the postulated sequence P, then $R_{I,i}=P_{I,i}$ and $R_{Q,i}=P_{Q,i}$ we expect α=1 and $E^2$=0. Solving for α:

$$E^2 = \sum_i (R_{I,i}^2 - 2\alpha R_{I,i}P_{I,i} + \alpha^2 P_{I,i}^2 + R_{Q,i}^2 - 2\alpha R_{Q,i}P_{Q,i} + \alpha^2 P_{Q,i}^2)$$

$$E^2 = \sum_i (R_{I,i}^2 + R_{Q,i}^2) - 2\alpha \sum_i (R_{I,i}P_{I,i} + R_{Q,i}P_{Q,i}) + \alpha^2 \sum_i (P_{I,i}^2 + P_{Q,i}^2)$$

The minimum squared error occurs at:

$$\frac{dE^2}{d\alpha} = -2\sum_i (R_{I,i}P_{I,i} + R_{Q,i}P_{Q,i}) + 2\alpha \sum_i (P_{I,i}^2 + P_{Q,i}^2) = 0$$

Therefore:

$$\alpha = \frac{\sum_i (R_{I,i}P_{I,i} + R_{Q,i}P_{Q,i})}{\sum_i (P_{I,i}^2 + P_{Q,i}^2)}$$

Thus:

$$E^2 = \sum_i (R_{I,i}^2 + R_{Q,i}^2) - 2\frac{\sum_i (R_{I,i}P_{I,i} + R_{Q,i}P_{Q,i})}{\sum_i (P_{I,i}^2 + P_{Q,i}^2)} \sum_i (R_{I,i}P_{I,i} + R_{Q,i}P_{Q,i}) + \left[\frac{\sum_i (R_{I,i}P_{I,i} + R_{Q,i}P_{Q,i})}{\sum_i (P_{I,i}^2 + P_{Q,i}^2)}\right]^2 \sum_i (P_{I,i}^2 + P_{Q,i}^2)$$

-continued $$E^2 = \sum_i (R_{I,i}^2 + R_{Q,i}^2) - \frac{\left[\sum_i (R_{I,i}P_{I,i} + R_{Q,i}P_{Q,i})\right]^2}{\sum_i (P_{I,i}^2 + P_{Q,i}^2)}$$

Which can be written as:

$$E^2 = \sum_i (R_{I,i}^2 + R_{Q,i}^2) \left\{ 1 - \frac{\left[\sum_i (R_{I,i}P_{I,i} + R_{Q,i}P_{Q,i})\right]^2}{\left[\sum_i (R_{I,i}^2 + R_{Q,i}^2)\right]\left[\sum_i (P_{I,i}^2 + P_{Q,i}^2)\right]} \right\}$$

$R_{I,i}$ and $R_{Q,i}$ are always ±1. Therefore, to minimize $E^2$, we need to maximize:

$$CC = \frac{\left[\sum_i (R_{I,i}P_{I,i} + R_{Q,i}P_{Q,i})\right]^2}{\left[\sum_i (R_{I,i}^2 + R_{Q,i}^2)\right] \times \left[\sum_i (P_{I,i}^2 + P_{Q,i}^2)\right]}$$

Where CC is defined as the correlation coefficient between the receive signal R and the postulated signal P. Notice that CC=1 and $E^2$=0 only when the received sequence R is equal to the postulated sequence P, and CC<1 otherwise.

Figure 15:
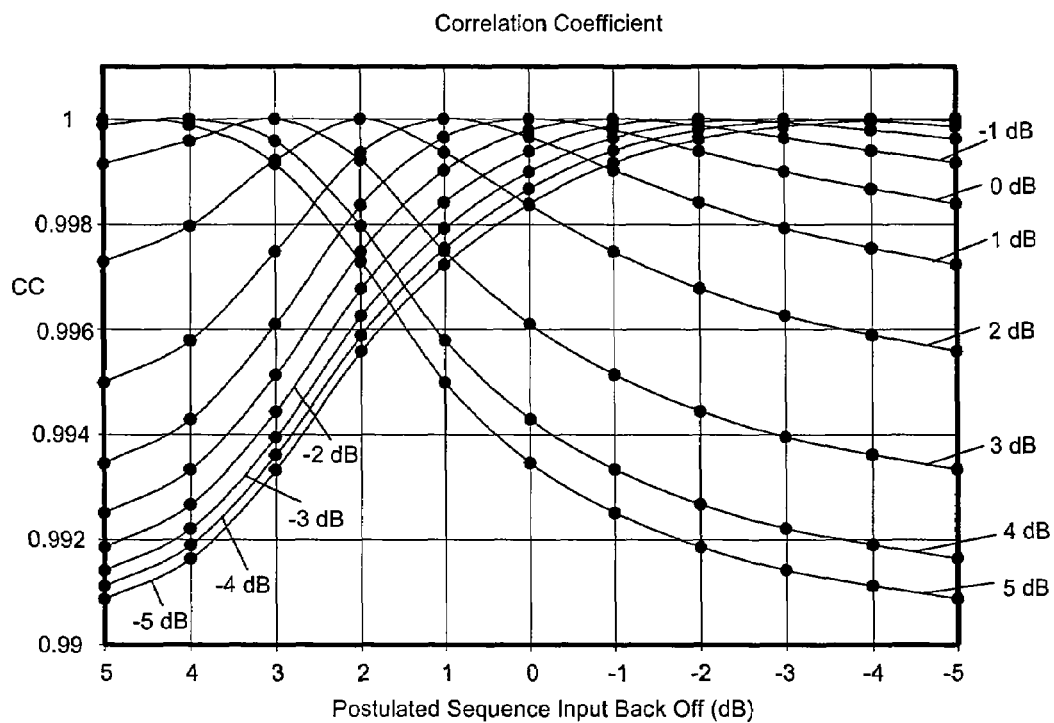
FIG. 15 is a graph of correlation coefficients corresponding to the embodiment of FIG. 13.

FIG. 15 is a graph of correlation coefficients corresponding to the embodiment of FIG. 13. The signals are noise free to illustrate the range of expected correlation coefficient values. For each level of IBO, the sequence is correlated against 11 different models of saturation ranging from 5 dB IBO to −5 dB IBO. The correlation coefficient is equal to unity when the level of IBO matches the postulated sequence IBO. Conversely, when comparing a linear or "no clipping" signal at 5 dB IBO to heavily saturated or "heavy clipping" signal at −5 dB IBO, the correlation coefficient drops to 0.9909. Likewise, comparing a saturated signal at −5 dB IBO to linear signal at or 5 dB IBO yields the same correlation coefficient value of 0.9909, as expected. Thus, a correlation coefficient between two sequences A and B are the same value regardless of the order, i.e., the correlation coefficient between A and B should be equal to the correlation coefficient between B and A.

The concept of "signal distance" also illustrates the non-linear nature of a saturation estimation. Recall that:

$$E^2 = \sum_i (R_{I,i}^2 + R_{Q,i}^2) \left\{ 1 - \frac{\left[\sum_i (R_{I,i}P_{I,i} + R_{Q,i}P_{Q,i})\right]^2}{\left[\sum_i (R_{I,i}^2 + R_{Q,i}^2)\right]\left[\sum_i (P_{I,i}^2 + P_{Q,i}^2)\right]} \right\}$$

$$E^2 = \left[\sum_i (R_{I,i}^2 + R_{Q,i}^2)\right](1 - CC)$$

When comparing a linear sequence (e.g., a sequence transmitted at 5 dB IBO), $R_{I,i}$=1 and $R_{Q,i}$=1. Thus, for a burst of 512 symbols, the summation term is equal to 1024. Comparing this with the heavily saturated sequence (IBO=−5 dB) yields a correlation coefficient of 0.9909. Thus $E^2$=9.3184 or, E=3.0526.

The transmitted sequence of symbols represents a point in 1024-dimensional space. The point is on a vertex of a 1024-dimensional hypercube, centered at the origin. Each edge of the hypercube is 2 units in length. The point of this location is designated as R. The postulated sequence that is passed through the non-linearity at IBO=−5 dB is at some other point P in 1024-dimensional space. The Euclidean distance between R and P is 3.0526 units. Thus, the "distance" between "no saturation" and "heavy saturation" is roughly 3 units.

The signal will also be corrupted with noise. Given a TDMA signal, for example, a minimum Es/No of 4.4 dB is required. Thus, the noise variance per any one axis is 0.3625. Since this is the noise variance per axis, it is also the noise variance along any straight line. Thus, this is the noise variance along the line connecting R and P. This noise variance equates to a standard deviation in the signal along the line connecting R and P of 0.602 units.

The distance between each adjacent set of points may also be evaluated. With R corresponding to an IBO of 5 dB, and P corresponding to an IBO of 4 dB, the distance is computed. Likewise, with R corresponding to an IBO of 4 and P corresponding to an IBO of 3 dB, another distance is computed. An entire set of distances is provided in the Table 1 below:

TABLE 1

SIGNAL DISTANCE

| Line Segment | From Point R | To Point P | Distance Between R and P |
|---|---|---|---|
| A | 5 dB IBO | 4 dB IBO | 0.340 |
| B | 4 dB IBO | 3 dB IBO | 0.653 |
| C | 3 dB IBO | 2 dB IBO | 0.894 |
| D | 2 dB IBO | 1 dB IBO | 0.806 |
| E | 1 dB IBO | 0 dB IBO | 0.594 |
| F | 0 dB IBO | −1 dB IBO | 0.468 |
| G | −1 dB IBO | −2 dB IBO | 0.359 |
| H | −2 dB IBO | −3 dB IBO | 0.273 |
| I | −3 dB IBO | −4 dB IBO | 0.219 |
| J | −4 dB IBO | −5 dB IBO | 0.189 |
| | | | Total distance = 4.796 |

Table 1 shows that the points do not fall on a straight line, as the sum of the distances between all connecting points—4.796 units—is not equal the distance computed between the two extreme points—3.0526 units.

The saturation estimator will operate in a fairly noisy environment. To optimize the estimation accuracy, the postulated saturation level to which the received signal (signal plus noise) is closest is identified. In one embodiment, a "brute force" approach is used to estimate the saturation level and entails postulating a large number of possible saturation levels and calculating the correlation coefficient between the received noisy signal and each of the postulated signals.

However, generating each postulated signal level is computationally complex, and thus another embodiment utilizes fewer postulated saturation levels. If the saturation points fell on a straight line, then the correlation coefficient of the received noisy signal with the end points (+5 dB IBO and −5 dB IBO) could be computed and the estimate of the actual saturation level could be obtained by linear interpolation. However, because the saturation points do not fall on a straight line, more than just two saturation levels should be postulated.

Figure 16:
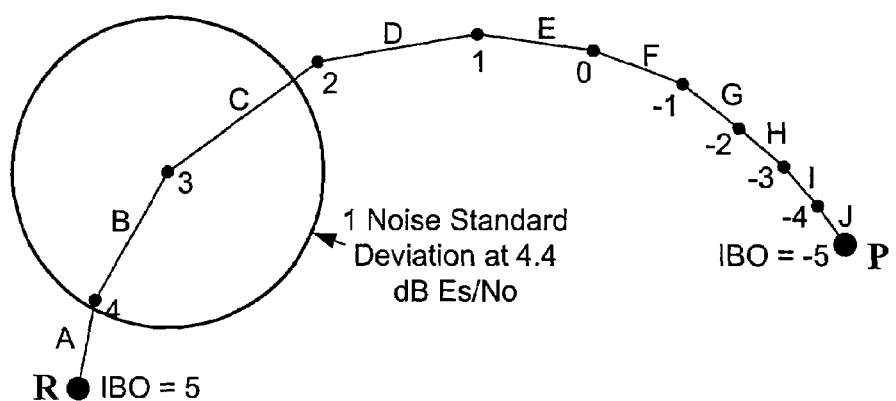
FIG. 16 is a graphical representation of a saturation trajectory ranging from 5 dB IBO to −5 dB IBO.

FIG. 16 is a graphical representation of the saturation trajectory ranging from 5 dB IBO to −5 dB IBO. As the saturation level varies from 5 dB IBO to −5 dB IBO, a trajectory in 1024-dimensional space that begins at point R and ends at point P is traversed. The actual trajectory is more complex as it exists in 1024-dimensional space; for simplicity, however, FIG. 16 shows the trajectory pseudo-plane and includes an example of the noise as it exists on this plane. The noise is shown centered at the 3 dB IBO point with a standard deviation of about 0.60 units. This noise level represents the worst case noise that can be expected for a TDMA example requiring and Es/No of 4.4 dB. It can be seen that the noise is rather large compared to the trajectory. In this TDMA mode (designated TDMA-Small), the noise is averaged over many bursts to keep the estimation error low.

FIG. 16 illustrates the averaging requirements. For example, if it is desired to reduce the standard deviation by a factor of 5, an average of at least $5^2$ or 25 bursts will be required. The IBO estimate is the value that is averaged. Averaging may be implemented with respect to the correlated values. However, in another embodiment, averaging is implemented with respect to the one-dimensional IBO estimate. This may result in a slight degradation of performance and bias errors, but the results can still be satisfactory.

For a TDMA-Large mode, the burst length may be four times as large. Accordingly, the distances are increased by a factor of two. For this mode, fewer bursts are required to be averaged. Because each burst duration is longer, however, the transmission time over which the averaging occurs is essentially the same as with the TDMA-Small mode. For the case where more powerful codes are used, resulting in lower operational Es/No values, additional averaging will be required to achieve the same accuracy of saturation.

Improving the accuracy of the embodiment of FIG. 13 in the presence of noise translates into increasing the distances between the points of FIG. 16. The distance between R and P is 3.05 units, and the signal is decimated to the symbol rate. The bandwidth of this signal is:

$$BW = \frac{F_{symbol}(1+\alpha)}{2}$$

Where:

$F_{symbol}$ is the symbol rate; and $\alpha$ is the filter roll off factor (which is typically 0.25).

Therefore, the Bandwidth is $(0.625)F_{symbol}$. Because this value is greater than one-half the symbol rate, the Nyquist sampling criteria is not satisfied. Thus, the sampled sequence is not without loss of information. Decimating to twice the symbol rate satisfies the Nyquist Criteria, but also impacts the saturation estimation complexity in two ways. First, the saturation estimation match filtering requirements double when the decimate rate is doubled. Second, the demodulation results in one sample per symbol. However, because the saturation estimation sequences are compared with the received sequence, the demodulation process is modified to generate two samples per symbol.

From a noise perspective, the filter bandwidth is (0.625) $F_{symbol}$ and the 3 dB point of the filter is at $(0.5)F_{symbol}$. This filter nearly filters the signal to a bandwidth of $F_{symbol}/2$. If the signals are represented at twice the symbol rate, then the filter will leave the noise samples highly correlated, which does not result in a significant enhancement of the SNR.

Figure 17:
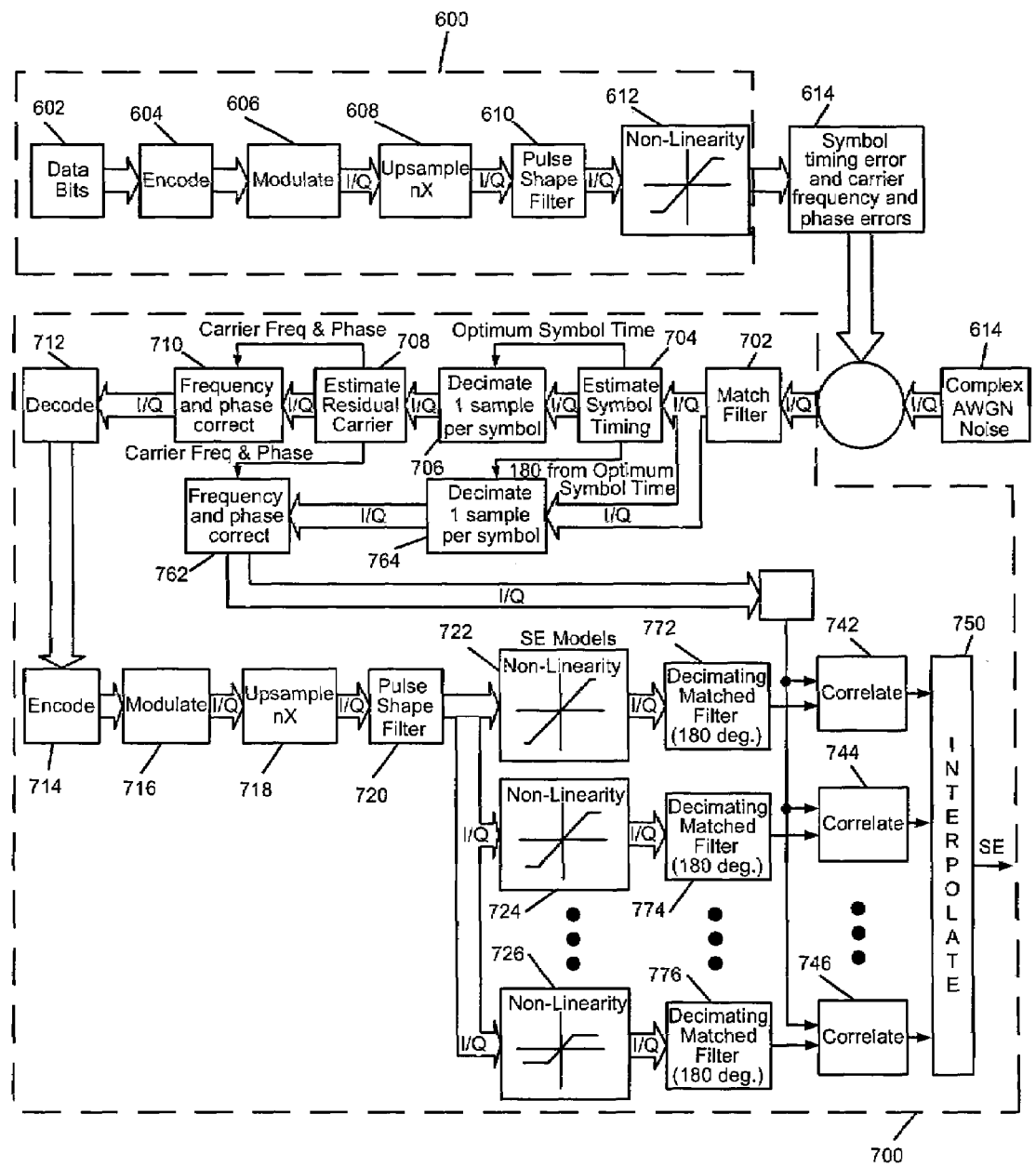
FIG. 17 is a block diagram of another embodiment of the receiver-based saturation estimator system.

Thus, decimating of the samples at the optimum "symbol time" may not be optimum for a saturation estimation. Accordingly, in another embodiment, the saturation estimator uses the 180° symbol timing phase point. FIG. 17 is a block diagram of another embodiment of the receiver-based saturation estimator system that uses the 180° symbol timing phase point. By using the 180° symbol timing phase point, only one sample per symbol is required. The saturation estimator extracts samples 180° from the optimum symbol timing phase.

Process blocks 702, 704, 706, 708, 710, 712, 714, 716, 718, 720, 722, 724, 726, 742, 744, 746 and 750 implement the same or similar processes as described with respect to like-numbered process blocks of the embodiment of FIG. 14. The estimation process block 704, however, also operates in conjunction with a decimation process block 760 and utilizes signal processing to estimate a 180° symbol timing phase point that is 180° from the optimum symbol timing. Likewise, the estimate residual carrier process block 708 and the frequency and phase correct process block 762 utilizes signal processing to obtain the carrier frequency and phase. The output of the estimate residual carrier process block 708 is thus a symbol sequence at a 180° symbol timing phase.

Each of the non-linearity models 722, 724 and 726 produce an estimated transmitted communication signal. The estimated transmitted communication signals are filtered using decimating match filters 772, 774 and 776 to obtain a plurality of estimated received data signals. In the embodiment of FIG. 17, the decimating matched filters 772, 774 and 776 are configured for a symbol sequence at a 180° symbol timing phase from the received symbol sequence generated by the frequency and phase correct process block 710.

Each of the estimated received data signals is then correlated with the actual received data signal by correlate processing blocks 742, 744, and 746. Each correlate processing block 742, 744 and 746 corresponds to a saturation estimate for each non-linearity models 722, 724, and 726, respectively. Accordingly, a saturation estimation may be determined by selecting the correlate processing block 742, 744 and 746 with the highest output correlation coefficient. Alternatively, the saturation estimate may be determined by interpolating among the correlation coefficients in interpolation processing block 750. The interpolation processing block 750 may implement any interpolation algorithm, such as a polynomial curve fit algorithm.

Figure 18:
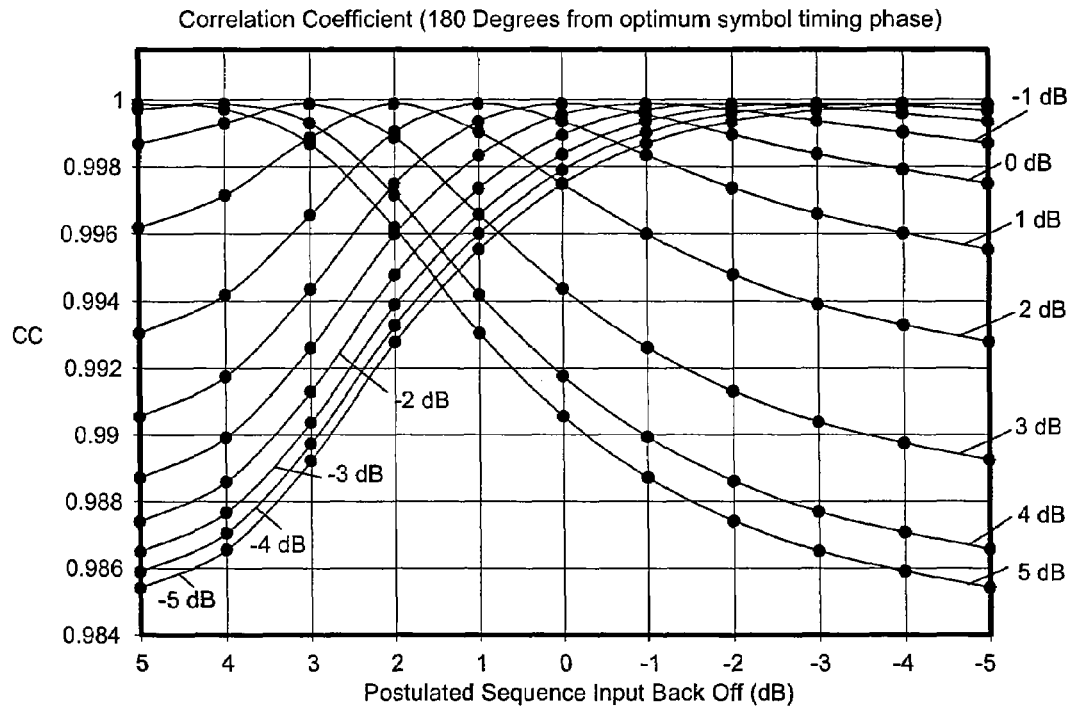
FIG. 18 is a graph of correlation coefficients corresponding to the embodiment of FIG. 16.

FIG. 18 is a graph of correlation coefficients corresponding to the embodiment of FIG. 17. As compared to FIG. 15, the correlation coefficient in FIG. 18 has decreased to 0.9854 for the case of a +5 dB IBO waveform correlated with a −5 dB IBO postulated waveform.

The signal distance has likewise changed. Recall that $$E^2 = \left[\sum_i (R_{I,i}^2 + R_{Q,i}^2)\right](1 - CC)$$

Because the sample time is 180° from the optimum symbol time, the expected value of $$\sum_i (R_{I,i}^2 + R_{Q,i}^2)$$

is slightly lower. For the "on symbol time" case this value was 1024. For a 180° from optimum symbol time sampling using a 25% RRC filtering, the value is 882. Thus $E^2$=12.87 or, E=3.59. Accordingly, the distance between R (the +5 dB IBO sequence) and P (the −5 dB IBO sequence) is 3.59 units. Compared to the "on symbol time" case of 3.05 units, this 180° version of the saturation estimator shows an improvement of 17%, which translates into a saturation estimator SNR improvement of 1.4 dB.

Figure 19:
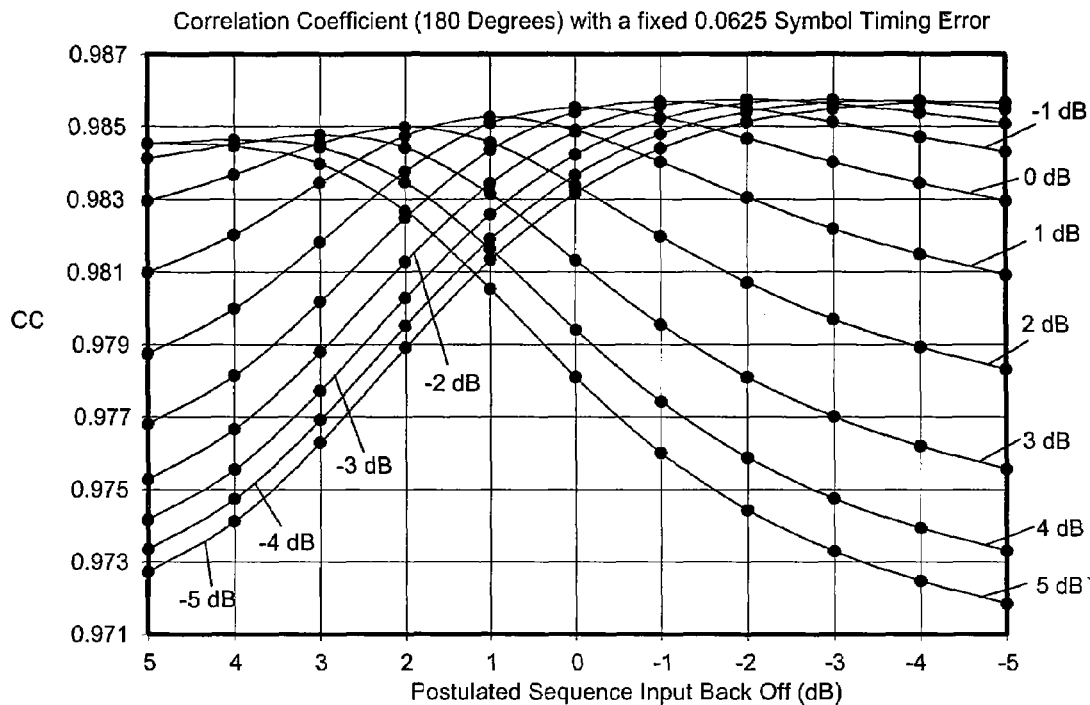
FIG. 19 is a graph of correlation coefficients with a fixed symbol timing error.
Figure 20:
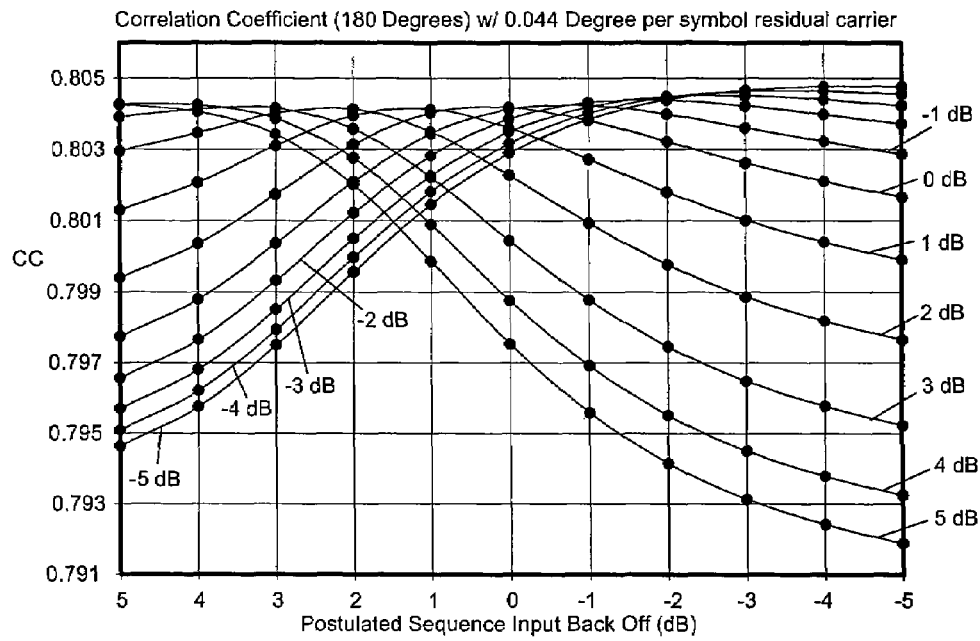
FIG. 20 is a graph of correlation coefficients with residual carrier error.

The correlation coefficient graphs of FIGS. 15 and 18 are independent of timing and frequency errors and noise. FIGS. 19 and 20 are graphs of correlation coefficients with a fixed symbol timing error and a residual carrier error, respectively.

Errors in symbol timing result in inner symbol interference or ISI. FIG. 19 is a graph of correlation coefficients subject to a fixed symbol timing offset at the receiver of 1/16th of a symbol. The standard deviation of the symbol timing estimator error, operating at an Es/No of 4.4 dB, is 0.024 symbols. Accordingly, the timing error of FIG. 19 is roughly 2.6 times greater than the standard deviation, and thus is representative of a fairly large symbol timing error relative to normal operation. Nevertheless, each correlation coefficient curve peaks at its proper location, and thus the correlation method is robust against symbol timing errors.

Noise may also result in carrier recovery error, which in turn results in a small residual carrier. FIG. 20 is a graph of correlation coefficients subject to a fixed frequency error at the receiver of 0.044 degrees per symbol (22.50 of rotation from beginning to end of the burst). The standard deviation of the residual carrier error, operating at an Es/No of 4.4 dB, is 0.018 degrees per symbol, which is roughly 90 of rotation from beginning to end of the burst. Accordingly, the frequency error of FIG. 20 is roughly 2.5 times greater than the standard deviation, and thus is representative of a fairly large carrier recovery error relative to normal operation. The correlation coefficient curves still exhibit their shape and peak near their proper location. However, there is a slight shift of the lower IBO points (e.g., in the case of excessive overdrive) to higher IBO points. This shift may cause the saturation estimator to estimate slightly on the high side when the transmitter is operating deep into a negative IBO. This error is relatively small and occurs mostly in a region at which the transmitter will rarely operate, and thus the saturation estimator is robust against residual carrier errors. Additionally, interpolation techniques, adaptive processing, or compensation processes may be implemented to minimize this error when the transmitter is operating in this region.

Processing requirements may be reduced by reducing the number of estimated communication signals (or postulated sequences) at different IBO levels. FIG. 16 illustrates that the signal trajectory as a function of IBO is not a straight line, and thus the number of postulated sequences may be reduced to as few as three. However, given that the trajectory is in a very high dimensional space and may have greater curvature than that suggested by FIG. 16, it may be beneficial to use at least five IBO postulated sequences, depending on the communication signal characteristics (e.g., packet size, data rate, etc.). In one embodiment, five sequences are chosen to represent points in the signal space that are equidistant along the trajectory. With respect to FIG. 16, the five points are indexed from 0 to 4: 0) +6.00 dB IBO, 1) +2.70 dB IBO, 2) +1.05 dB IBO, 3) –0.85 dB IBO, and 4) –5.00 dB IBO.

To identify the IBO value that yields the highest correlation coefficient, an interpolation algorithm is implemented. First, the five correlation coefficients at the five IBO indices are calculated. If the highest three correlation coefficients include indices (0,1,2) or (1,2,3) or (2,3,4), then these three points are fit to a second-order polynomial and an interpolation to estimate the index where the maximum correlation coefficient occurs is performed. From the interpolated index of the maximum, the maximum IBO estimate is obtained by an inverse transform from the five postulated IBO points at the five indices. This latter operation can be implemented in many ways, such as by a look-up table, a polynomial curve fit, etc.

However, if the highest three correlation coefficients are not adjacent, i.e., the three highest correlation coefficients include indices (0,1,3), (0,1,4), (0,2,3), (0,2,4), (0,3,4), (1,2,4), or (1,3,4), then the index of the IBO that generated the highest correlation coefficient is selected. This latter condition typically occurs when the saturation estimate point corresponds to a value greater than +6 dB IBO or less than –5 IBO. At the edges near +6 dB IBO or –5 dB IBO the interpolation method can generate index estimates that are below 0 or above 4. Accordingly, the index estimates are clamped to –0.1 to +4.1, which corresponds to +7 dB IBO and –6.5 dB IBO, respectively.

While an ideal amplitude hard limiter transmitter model may be implemented in the saturation estimator, the accuracy of saturation estimations may be improved by utilizing actual transmitter transmission data.

Figure 21:
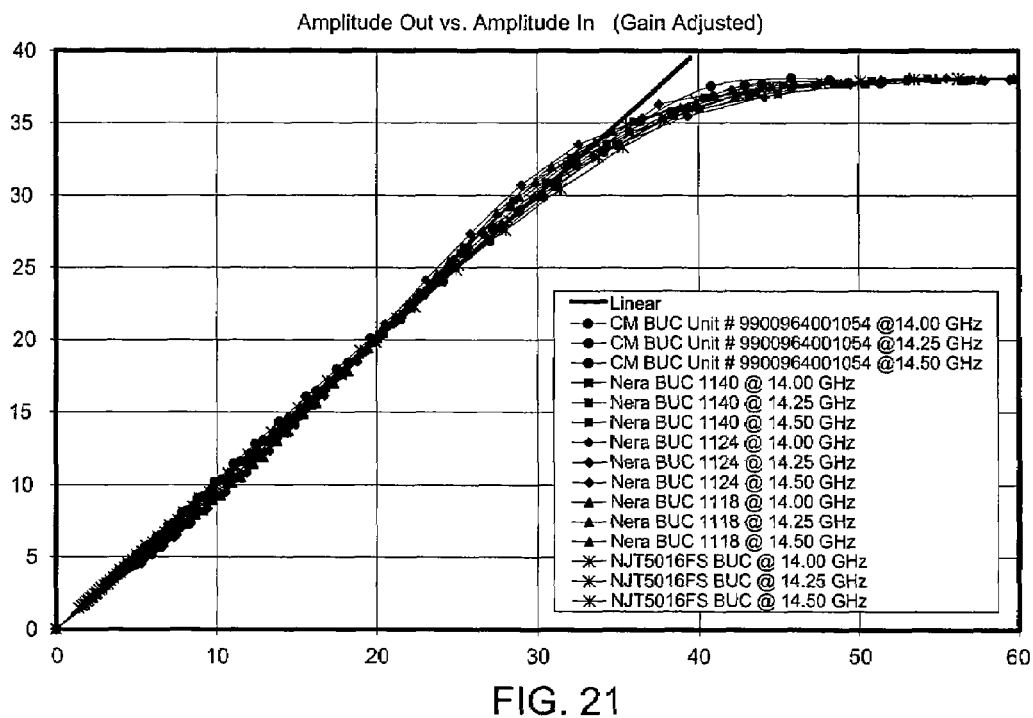
FIG. 21 is a graph of a plurality of actual BUC transfer functions.
Figure 22:
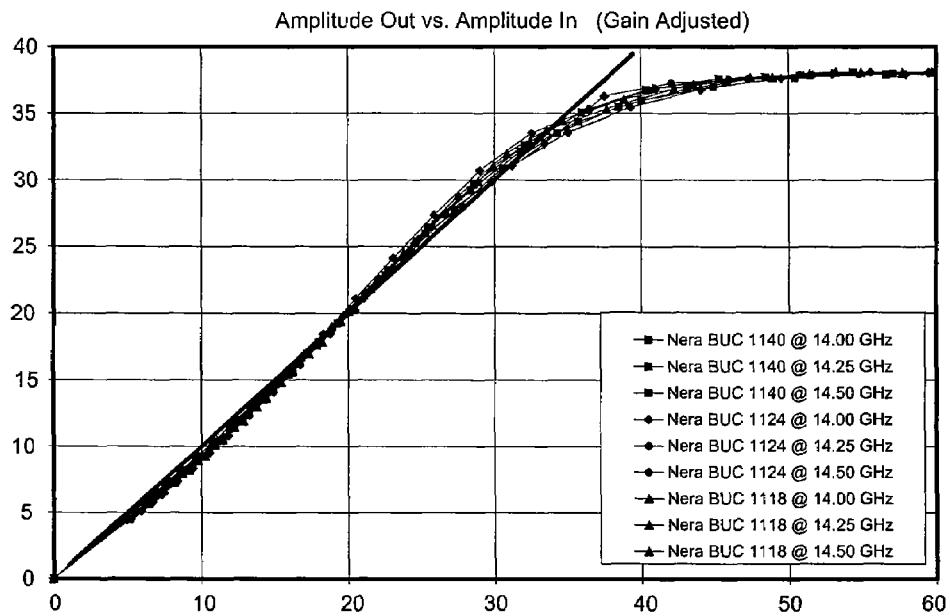
FIG. 22 is a graph of a plurality of S-shaped BUC transfer functions.

FIG. 21 is a graph of a plurality of actual BUC amplitude transfer functions. The amplitude data of fifteen transfer functions are expressed as a unity gain amplitude transfer function. FIG. 21 shows that the fifteen transfer functions are similar, however, the NERA BUCs exhibit an "S" shape transfer function, as shown in FIG. 22. An "S" shaped distortion will generate some spectral re-growth that may mimic saturation. With respect to saturation estimates, the "S" shaped distortion typically does not cause significant errors if the "S" nature of the curve is not significant, because the saturation estimation detects the distortions that occur at or near the knee of the transfer function, which is much more significant.

Figure 23:
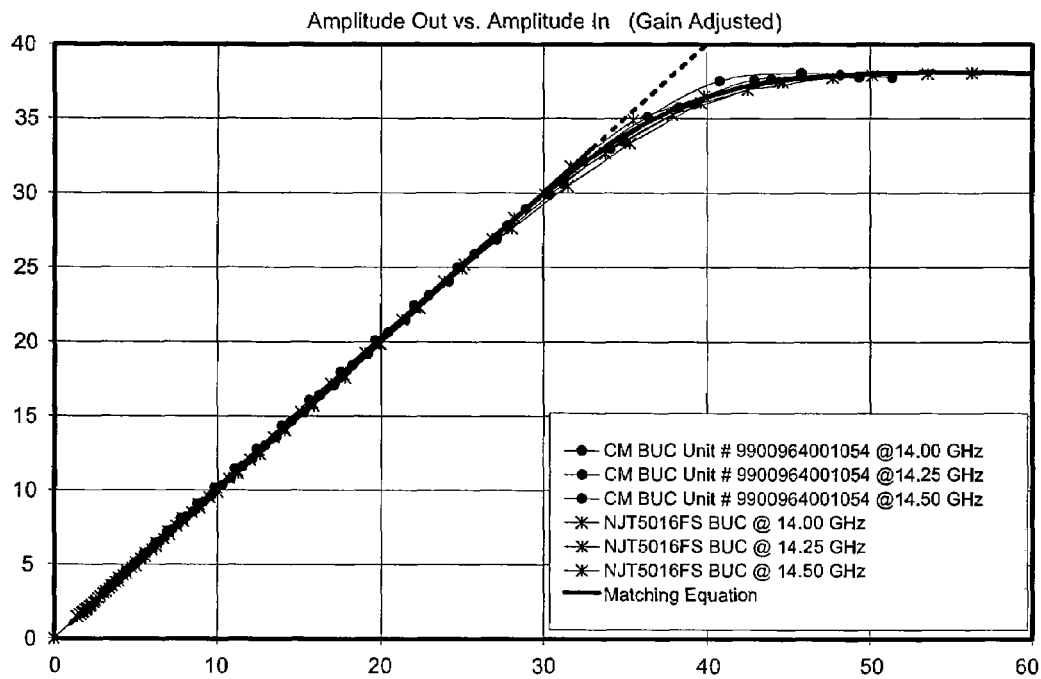
FIG. 23 is a graph of a plurality of linear BUC transfer functions.

For the more linear transfer functions, a matching equation may be used as a model. FIG. 23 is a graph of a plurality of linear BUC transfer functions and a graph of a corresponding matching function. The following equation is used to match these transfer functions:

$$Y = G \times X \times \left(\left(\frac{X}{\beta}\right)^k + 1\right)^{\frac{-1}{K}} \times \left(\left(\frac{X}{\beta \times N}\right)^l + 1\right)^{-1}$$

where G=1.01, N=6, l=3, k=9.2, and β=38.3969. These parameters are found empirically, and will depend on the family of transfer function data to be modeled.

Figure 24:
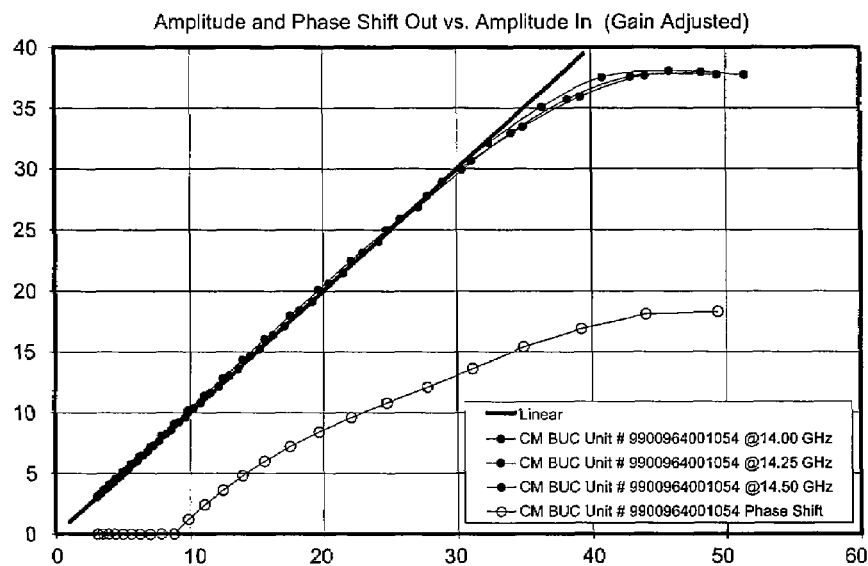
FIG. 24 is a graph of a plurality of BUC transfer functions including phase data.
Figure 25:
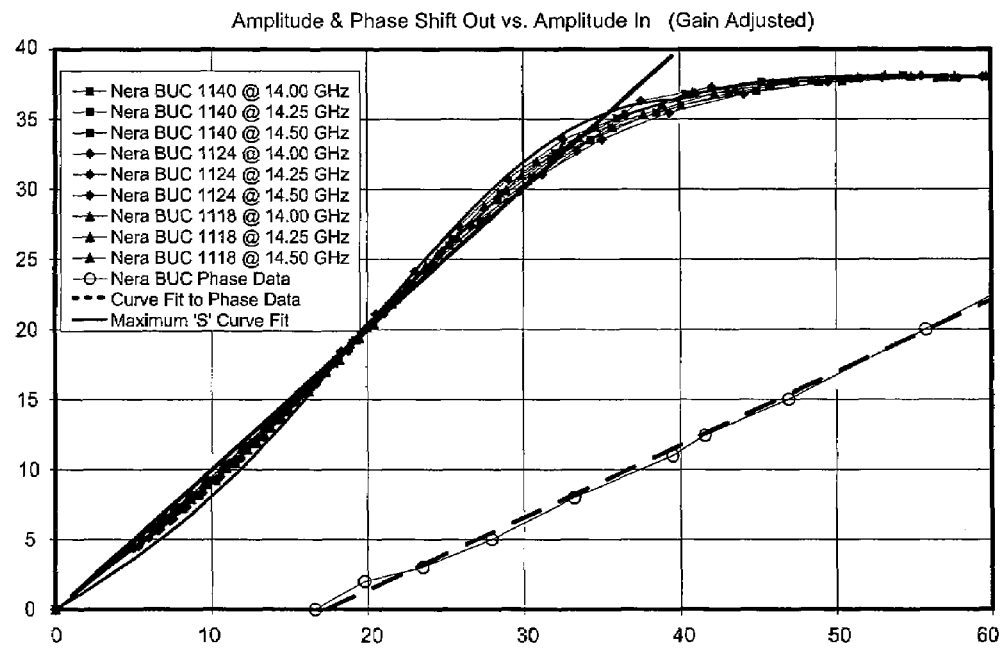
FIG. 25 is a graph of a plurality of BUC transfer functions including phase data and corresponding curve fits.

FIG. 24 is a graph of a plurality of BUC transfer functions including phase data. In general, phase shifting varies significantly and has been found to be largely dependent on particular BUC models and manufacturers. FIG. 25 is a graph of a plurality of BUC transfer functions including phase data and corresponding curve fits. The BUC transfer function model includes an "S" nature that exceeds the worst case "S" nature of FIG. 22.

FIG. 25 also illustrates that phase data may be modeled per a curve fit to the actual phase data of the BUCs on a BUC-particular basis. Implementing phase data may yield more accurate saturation estimates; however, saturation estimates based on amplitude data alone yield acceptable results. Accordingly, because there is little consistency in phase data for BUC transmitters, a saturation estimation system typically may not implement phase data modeling.

If a saturation estimation system is implemented based on a particular transmitter, or based on a particular collection of transmitters having similar phase characteristics, then phase data modeling may be included. Additionally, for communication systems in which transmitters have common phase characteristics, phase data modeling may also be implemented. Note that the phase data of FIGS. 24 and 25 are not constant, but rather begin after a particular input level. For example, the phase data in FIG. 25 begins at approximately 18 input units, which is about 8 dB backed off from the 1 dB compression point, and exhibits a very linear relationship across the range.

Figure 26:
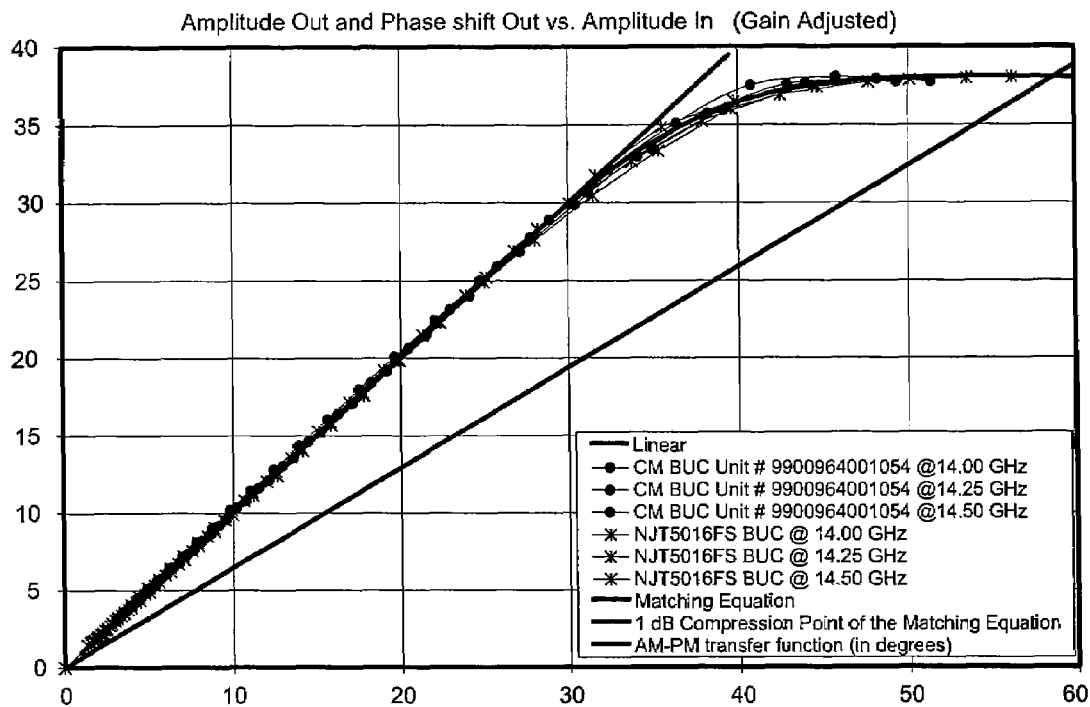
FIG. 26 is another graph of a plurality of BUC transfer functions including phase data and corresponding curve fits.

For modeling BUC performance to generate a saturation estimation algorithm, a more general phase data model may be used. FIG. 26 is another graph of a plurality of BUC transfer functions including phase data and corresponding curve fits. In FIG. 26, the phase data comprises a constant slope extending back to 0. While this causes a slightly increased signal distortion in the model, demodulation eliminates any phase shift at the nominal received symbol points. Accordingly, the "zero phase shift" point becomes normalized to the nominal symbol amplitude.

Extending such a linear curve to the origin typically effects the signal with amplitudes below 18 units. However, because these are relatively low amplitude points, the extra signal deviation represents relatively little additional distortion energy. The majority of the distortion is attributed to the slope of phase data transfer curve.

Figure 27:
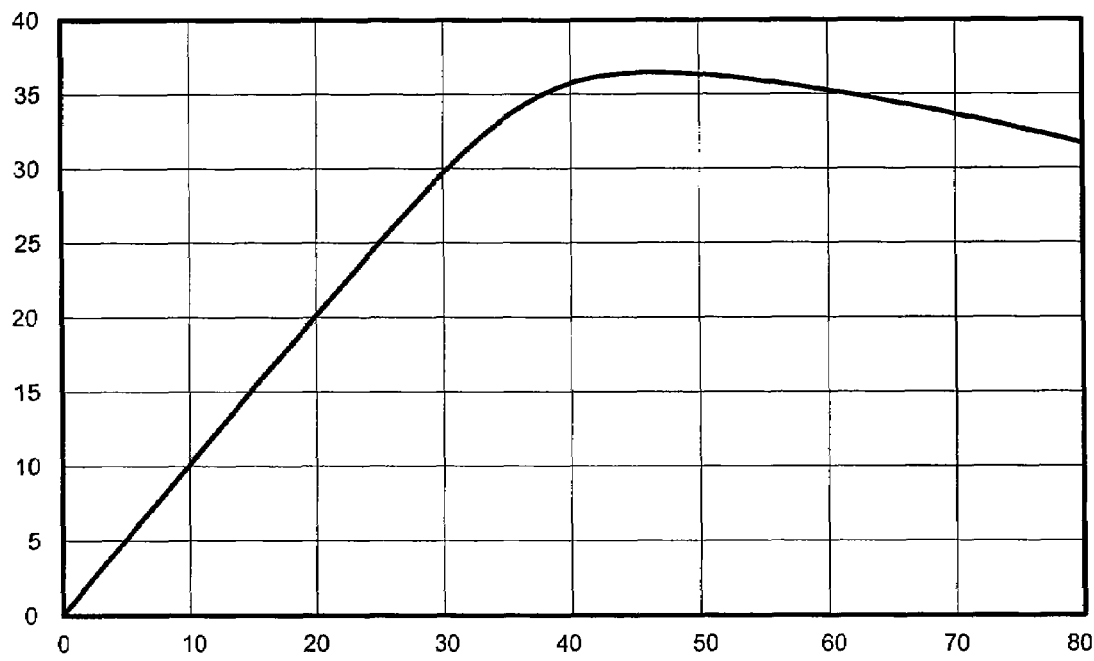
FIG. 27 is a graph of a BUC transfer function with a negative slope saturation.

Some transmitters also exhibit a negative slope after saturation; accordingly, driving the transmitter deep into saturation actually decreases the signal quality. FIG. 27 is a graph of a BUC transfer function with a negative slope saturation. An example modified matching equation may be implemented to address this phenomenon is:

$$Y = G \times X \times \left(\left(\frac{X}{\beta}\right)^k + 1\right)^{\frac{-1}{K}} \times \left(\left(\frac{X}{\beta \times N}\right)^l + 1\right)^{-1}$$

where G=1.01, N=3.5, l=3, k=10, and β=38.13.

In general, transmitter transfer function data, such as the BUC data of FIGS. 21-27 above, may be collected for a plurality of transmitters and stored in a computer store, such as a memory device. Collected data may then be provided to receiver systems implementing the receiver based saturation estimator described herein. Modeling data may also be generated and stored in the computer store and provided to the receiver systems. The modeling data may include the matching equations described above, and may include a plurality of non-linearity models as described above.

In another embodiment, the receiver system is operable to interrogate transmitters over a communication link to gather and store transmitter transfer function data in real time. The interrogation may comprise causing the transmitter to transmit a particular set of test data at varying transmission power levels, e.g., from a very low power level through a highly saturated power level. The transmitter transfer function may thus be stored at the receiver system and the corresponding matching equations and/or non-linearity models generated automatically.

Figure 28:
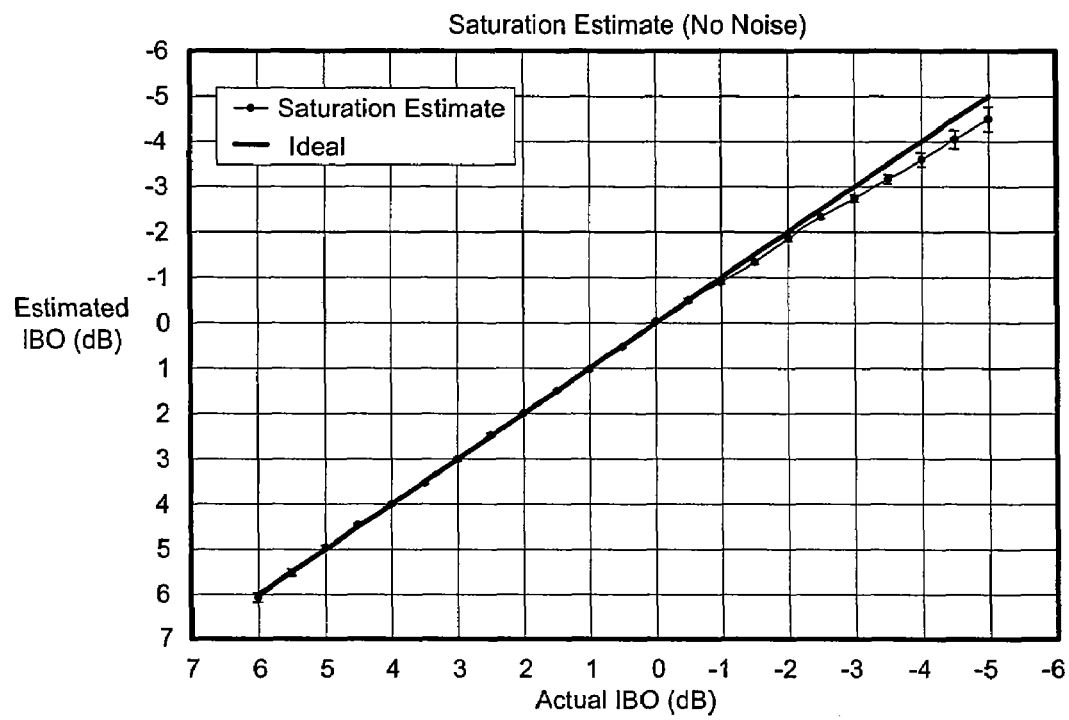
FIG. 28 is a graph of a saturation estimator performance without noise.
Figure 29:
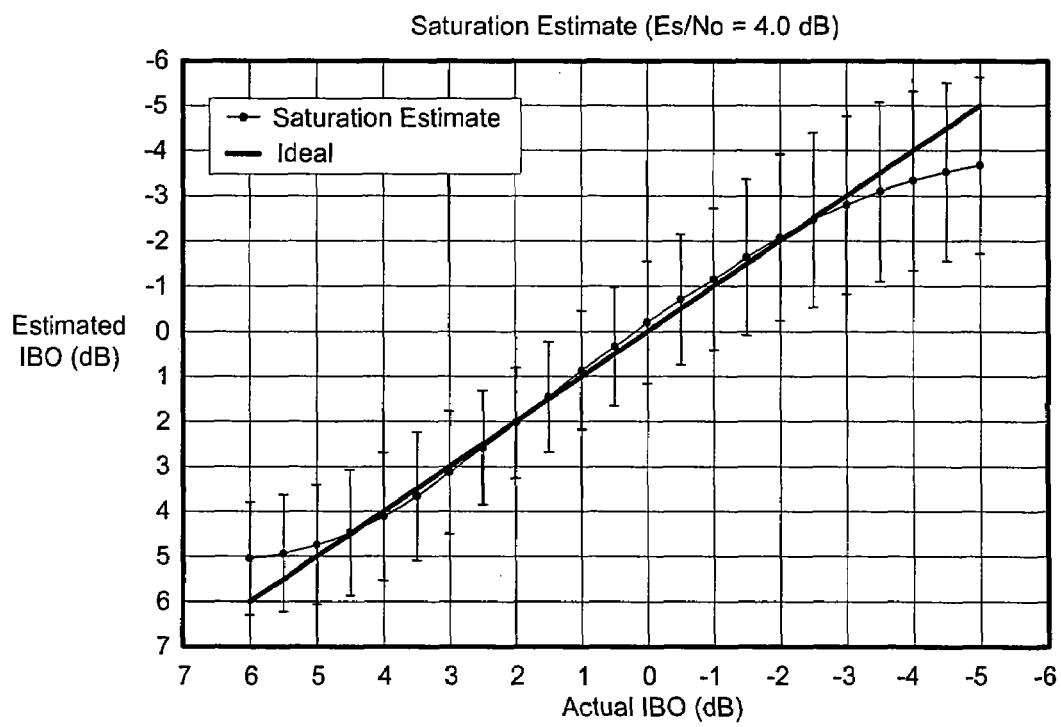
FIG. 29 is a graph of a saturation estimator performance with noise.

FIGS. 28 and 29 are graphs of saturation estimator performance without noise and with noise, respectively. The error bars represent 1 standard deviation of variability for a single packet of 512 symbols. The saturation estimator utilizes a 3× over sampling and five postulated sequences, and a second-order polynomial interpolation. FIG. 28 illustrates very little error throughout the range of interest (−5 dB to +6 dB IBO) between the actual and estimated IBO levels. When the transmitted signal is run deep into saturation at large negative IBO levels, the estimator reports slightly lower values, but the estimates are still accurate.

FIG. 29 shows saturation estimator performance in the presence of a noise level of 4.0 dB. The estimate tends to be slightly low for high IBO operating levels and slightly high for low IBO operating levels. This biasing is due to the effect of clamping the estimate when noise is included in the channel. The error is less than 0.3 dB in magnitude in the range between +5 dB and −3.0 dB. As the operating Es/No is increased, the magnitude of the error bars will decrease.

If a transmitter is to operate near +0.5 dB IBO, and the saturation estimate is accurate to about +/−1 dB, the effective operating loss is kept below 0.25 dB. At +0.5 dB IBO and 4.0 dB Es/No, the estimation bias error is about 0.1 dB on average. The variance is approximately 1.3 dB, and can be made to be arbitrarily small by sufficient averaging packets or bursts. For example, averaging over 36 packets will reduce the standard deviation by a factor of 6, and the error bars in FIG. 30 then correspond to 6σ error bars. Accordingly, the likelihood of measuring greater than 1.5 dB IBO or less than −0.5 dB IBO in this case is approximately 0.01%. Averaging over 63 packets lowers this likelihood to nearly 10 parts per billion.

Of course, there is a tradeoff between averaging time and measurement accuracy. Taking into account the impact of measurement error on the system, the averaging time, the burst rate, the average fade duration, estimation error, etc., an averaging over 30 packets is suggested for practical implementations for small packet sizes (e.g., ~500 symbols). The packet averaging parameter may be adjusted as required. Adjustments may be based on the encoding used in the system (e.g., 8-ary, TDMA-Small QPSK, TDMA-Large QPSK, etc.). Typically, the variation of the estimate decreases with larger packets, particularly around the desired maximum operating point of +0.5 dB IBO. The lower variation provides for averaging over a fewer number of packets. Averaging over 6 packets is recommended for large packet sizes, e.g., $(64,57)^2$ TPC code with QPSK and 2048 symbol packets, TDMA-Large or S-ALOHA large and 8-ary modulation.

The actual modulation format implemented typically has little effect on the saturation estimate. The modulation and filtering causes variations in the signal amplitude that are further affected by the transmitter non-linearity. However, when using only packets that pass CRC at the receiver, the transmitted and filtered waveform can be reproduced. The modulation is tracked by the demodulator and the correlator compares the received symbols with the postulated sequences of symbols generated from the reconstructed transmitted waveform. Thus, the method is largely independent of the modulation format used.

The modulation format, however, enters into the overall performance of the saturation estimator indirectly through the variations in amplitude. The primary performance change is that the standard deviation of the saturation estimator estimate under noise conditions is less for the larger packets and higher operating Es/No.

A system and method for estimating the degree of saturation under which a transmitter is operating based solely on the received communication signal at the receiver has thus been disclosed. The estimation or determination is based on a modulation characteristic of a transmitted communication signal received at the receiver system from the transmitter. The system and method is largely independent of modulation type, and is robust over a wide variety of transmitters. While the system and method described here have been primarily illustrated in the context of a satellite communication system, the systems and method disclosed herein may be adapted to any digital communication system, such as a cellular telephone communication system or a mobile device data communication system. Additionally, while many of the examples of the systems and methods described herein include error correction and/or error detection, the systems and methods described herein may be implemented for use with communication signals that do not include error correction and/or error detection, or may alternatively not utilize error correction and/or error detection for such encoded communication signals.

The embodiments described herein are examples of structures, systems or methods having elements corresponding to the elements of the invention recited in the claims. Additionally, the flow diagrams described herein, which describe particular methods and/or corresponding acts in support of steps, may also be utilized to implement corresponding software structures and algorithms, and equivalents thereof. The flow diagrams and methods described herein may be processor-implemented using processing circuitry that may comprise one or more microprocessors, ASICs, FPGAs, or other devices operable to be configured to implement the systems and/or methods described herein. For implementation on such devices that are operable to execute software instructions, the flow diagrams and methods described herein may be implemented in processor instructions stored in a computer-readable medium, such as executable software stored in a computer memory store.

This written description may enable those of ordinary skill in the art to make and use embodiments having alternative elements that likewise correspond to the elements of the invention recited in the claims. The intended scope of the invention thus includes other structures, systems or methods that do not differ from the literal language of the claims, and further includes other structures, systems or methods with insubstantial differences from the literal language of the claims.

What is claimed is:

1. A device for estimating a characteristic of at least one of a transmitter or a transmission medium for a received communication signal transmitted from the transmitter, the device comprising:
    a signal processor unit configured to filter the received communication signal to generate a received symbol sequence;
    a data processor unit, communicatively coupled with the signal processor unit, and configured to decode the received symbol sequence to recover data; and
    an estimator unit, communicatively coupled with the data processor unit, and configured to:
        generate a transmitted symbol sequence based on the recovered data;
        compare the transmitted symbol sequence to the received symbol sequence; and
        estimate the characteristic of at least one of the transmitter or transmission medium based on the comparison of the transmitted symbol sequence to the received symbol sequence.

2. The device of claim 1, wherein to compare the transmitted symbol sequence to the received symbol sequence, the estimator unit is configured to:
    generate a plurality of characteristic transfer functions;
    input the communication signal into each characteristic transfer function to generate a plurality of estimated transmitted communication signals;
    filter the plurality of estimated transmitted communication signals to generate a plurality of estimated received symbol sequences; and
    compare each of the estimated received symbol sequences to the received symbol sequence, wherein the estimated received symbol sequences comprise the transmitted symbol sequence.

3. The device of claim 2, wherein to compare each of the estimated received symbol sequences to the received symbol sequence, the estimator unit is configured to generate a correlation coefficient for each of the comparisons of the estimated received symbol sequences to the received symbol sequence.

4. The device of claim 2, further comprising:
    an interrogator unit, communicatively coupled with the estimator unit, and configured to:
        interrogate one or more other transmitters over a communication link to obtain the characteristic transfer function data; and
        generate the plurality of characteristic transfer functions based on the characteristic transfer function data obtained by the interrogation.

5. The device of claim 1, wherein,
    to compare the transmitted symbol sequence to the received symbol sequence, the estimator unit is configured to generate an average comparison of the transmitted symbol sequence to the received symbol sequence over time; and
    to estimate the characteristic, the estimator unit is configured to estimate the characteristic of the transmitter based on the average.

6. The device of claim 1, wherein the estimator unit is further configured to:
    determine when the characteristic crosses a threshold; and
    trigger the device to transmit an instruction to the transmitter to modify transmission based at least in part on the determination.

7. The device of claim 1, wherein the data processing unit is further configured to:
    determine whether the recovered data is error free; and
    control the estimator unit to generate the transmitted symbol sequence based at least in part on whether the recovered data is determined to be error free.

8. The device of claim 1, wherein the characteristic comprises a saturation level.

9. A processor-implemented method of estimating a characteristic of at least one of a transmitter or a transmission medium, the method comprising:
    receiving a communication signal transmitted from a transmitter;
    filtering the received communication signal to generate a received symbol sequence;
    decoding the received symbol sequence to recover data;
    generating a transmitted symbol sequence based on the recovered data;
    comparing the transmitted symbol sequence to the received symbol sequence; and
    estimating the characteristic of the transmitter or transmission medium based on the comparison of the transmitted symbol sequence to the received symbol sequence.

10. The method of claim 9, further comprising:
    determining when the characteristic crosses a threshold; and
    transmitting data identifying the characteristic exceeding the threshold.

11. The method of claim 10, wherein the transmitted data comprises an instruction to modify power at the transmitter.

12. The method of claim 10, wherein the transmitted data comprises an instruction to modify a data rate at the transmitter.

13. The method of claim 10, wherein the characteristic comprises a saturation level.

14. The method of claim 9, further comprising:
analyzing the recovered data for errors; and
triggering the generating step based on the error analysis.

15. A device for estimating a characteristic of at least one of a transmitter or a transmission medium for a received communication signal transmitted from a transmitter, the device comprising:
a signal processor unit configured to demodulate the received communication signal to generate a received data signal;
a data processor unit, coupled with the signal processor unit, and configured to decode the received data signal to recover data corresponding to data generated at the transmitted; and
an estimator unit, coupled with the data processor unit, and configured to:
generate a transmitted data signal based on the recovered data;
compare the transmitted data signal to the received data signal; and
estimate the characteristic of at least one of the transmitter or transmission medium based on the comparison of the transmitted data signal to the received data signal.

16. The device of claim 15, wherein the received data signal generated by the signal processor unit comprises a received symbol sequence.

17. The device of claim 16, wherein the transmitted data signal generated by the estimator unit comprises a transmitted symbol sequence corresponding to data generated at the transmitter.

18. The device of claim 15, wherein the received data signal generated by the signal processor unit comprises a digitized version of the received communication signal.

19. The device of claim 15, wherein the transmitted data signal generated by the estimator unit comprises an estimation of a digitized version of a transmitted communication signal before the characteristic modifies the transmitted communication signal.

20. A processor-implemented method for estimating a characteristic of at least one of a transmitter or a transmission medium, the method comprising:
digitizing a received communication signal to generate a digitized version of the received communication signal;
decoding the digitized version of the received communication signal to recover data corresponding to data generated at the transmitter;
generating a digitized version of a transmitted communication signal based on the recovered data;
comparing the digitized version of the transmitted communication signal to the digitized version of the received communication signal; and
estimating the characteristic of at least one of the transmitter or transmission medium based on the comparison of the digitized version of the transmitted communication signal to the digitized version of the received communication signal.

21. The method of claim 20, further comprising:
receiving the communication signal in analog form.

22. The method of claim 20, wherein the digitized version of the received communication signal comprises a received symbol sequence.

23. The method of claim 20, further comprising, wherein the digitized version of the transmitted communication signal comprises a symbol sequence corresponding to data generated at the transmitter.

24. A processor for estimating a characteristic of at least one of a transmitter or a transmission medium for a received communication signal transmitted from the transmitter, the processor configured to:
receive a data signal corresponding to the received communication signal;
decode the received data signal to recover data corresponding to data generated at the transmitter;
generate a transmitted data signal based on the recovered data;
compare the transmitted data signal to the received data signal; and
estimate the characteristic of at least one of the transmitter or transmission medium based on the comparison of the transmitted data signal to the received data signal.

25. The processor of claim 24, wherein,
the received data signal comprises a received symbol sequence; and
the transmitted data signal comprises a transmitted symbol sequence corresponding to data generated at the transmitter.

26. The processor of claim 24, wherein,
the received data signal comprises a digitized version of the received communication signal; and
the transmitted data signal comprises an estimation of a digitized version of a communication signal generated at the transmitter before the characteristic modifies the digitized version of communication signal.

27. A system for estimating a characteristic of at least one of a transmitter or a transmission medium, the system comprising:
a transmitter configured to:
generate data for a communication signal; and
transmit the communication signal;
a receiver, in communication with the transmitter, and configured to:
receive the transmitted communication signal;
digitize the received communication signal to generate a digitized version of the received communication signal;
decode the digitized version of the received communication signal to recover data corresponding to the generated data at the transmitter;
generate a digitized version of a transmitted communication signal based on the recovered data;
compare the digitized version of the transmitted communication signal to the digitized version of the received communication signal; and
estimate the characteristic of at least one of the transmitter or the transmission medium based on the comparison of the digitized version of the transmitted communication signal to the digitized version of the received communication signal.

28. The system of claim 27, wherein,
the transmitter comprises a user terminal; and
the receiver comprises a hub.

29. The system of claim 27, wherein the transmitter communicates with the receiver via a satellite.

30. The system of claim 27, wherein the transmitter wirelessly communicates with the receiver.

31. The system of claim 27, wherein the receiver is further configured to:
   determine when the characteristic exceeds a threshold; and
   transmit data identifying the characteristic exceeding the threshold.

32. The system of claim 31, wherein the transmitted data comprises an instruction to modify power at the transmitter and to modify a data rate at the transmitter.

* * * * *